US012721346B2

(12) United States Patent
Takino et al.

(10) Patent No.: US 12,721,346 B2
(45) Date of Patent: Sep. 1, 2026

(54) ANTIMICROBIAL/ANTIVIRAL COMPOSITION

(71) Applicant: NBC MESHTEC INC., Tokyo (JP)

(72) Inventors: Masako Takino, Tokyo (JP); Shinji Kurahashi, Tokyo (JP); Yoshie Fujimori, Tokyo (JP); Nobukazu Motojima, Tokyo (JP); Tsuruo Nakayama, Tokyo (JP)

(73) Assignee: NBC MESHTEC INC., Tokyo (JP)

( * ) Notice: Subject to any disclaimer, the term of this patent is extended or adjusted under 35 U.S.C. 154(b) by 278 days.

(21) Appl. No.: 18/501,310

(22) Filed: Nov. 3, 2023

(65) Prior Publication Data

US 2024/0065273 A1 Feb. 29, 2024

Related U.S. Application Data

(63) Continuation of application No. 16/638,857, filed as application No. PCT/JP2018/032677 on Sep. 3, 2018, now abandoned.

(30) Foreign Application Priority Data

Sep. 4, 2017 (JP) ................................ 2017-169865
Sep. 4, 2017 (JP) ................................ 2017-169874

(51) Int. Cl.
*A01N 59/20* (2006.01)
*A01N 25/10* (2006.01)
*A01N 25/26* (2006.01)

(52) U.S. Cl.
CPC ............. *A01N 59/20* (2013.01); *A01N 25/10* (2013.01); *A01N 25/26* (2013.01)

(58) Field of Classification Search
CPC ........ A01N 59/20; A01N 25/10; A01N 25/26; A01N 25/04; C09D 5/14; C09D 7/62; C09D 201/00
See application file for complete search history.

(56) References Cited

U.S. PATENT DOCUMENTS 10,744,495 B2 8/2020 Tokudome
2004/0224005 A1 11/2004 Gabbay
2006/0246130 A1 11/2006 Dahl
2011/0195108 A1* 8/2011 Fujimori .................. C12N 7/00 424/617
2012/0301528 A1 11/2012 Uhlmann et al.
2012/0301530 A1 11/2012 Uhlmann et al.
2012/0301531 A1 11/2012 Uhlmann et al.
2012/0301533 A1 11/2012 Uhlmann et al.
2013/0171225 A1 7/2013 Uhlmann et al.
2013/0171266 A1 7/2013 Uhlmann et al.
2013/0315972 A1 11/2013 Krasnow et al.
2013/0344124 A1 12/2013 Hashimoto et al.
2014/0127321 A1* 5/2014 Kurahashi ............. A01N 59/16 264/234
2014/0271757 A1* 9/2014 Agrawal .................. C09D 5/14 507/90
2014/0294989 A1 10/2014 Miyaishi et al.
2014/0322353 A1 10/2014 Miyaishi et al.
2015/0147372 A1 5/2015 Agrawal et al.
2015/0351385 A1 12/2015 Ueda et al.
2015/0373989 A1 12/2015 Krasnow et al.
2015/0376379 A1 12/2015 Krasnow et al.
2016/0032180 A1 2/2016 Agrawal et al.
2016/0046796 A1 2/2016 Krasnow et al.
2016/0135470 A1 5/2016 Agrawal et al.
2016/0220728 A1 8/2016 Adams et al.
2016/0251571 A1 9/2016 Agrawal et al.
2017/0175275 A1 6/2017 Krasnow et al.
2018/0291512 A1 10/2018 Krasnow et al.
2019/0144738 A1 5/2019 Agrawal et al.

FOREIGN PATENT DOCUMENTS

| | | |
|---|---|---|
| CA | 2 835 650 | 11/2012 |
| CA | 2 946 586 | 11/2015 |
| CN | 106561712 | 4/2017 |
| CN | 106561712 A * | 4/2017 |
| EP | 2 692 439 | 2/2014 |
| IL | 229619 | 1/2014 |
| JP | 3-84066 | 4/1991 |
| JP | 2008-8138 | 1/2008 |
| JP | 2009-155461 | 7/2009 |
| JP | 2010-168578 | 8/2010 |
| JP | 2010-239897 | 10/2010 |
| JP | 2012-210557 | 11/2012 |
| JP | 2014-1190 | 1/2014 |
| JP | 5457504 | 1/2014 |
| JP | 2014-118358 | 6/2014 |

(Continued)

OTHER PUBLICATIONS

Antifungal Composition (Year: 2016).*
Dannong English Translation CN 106561712.*
A core shell structure (Year: 2019).*
JP-2016069381 translation, Antifungal composition. (Year: 2016).*
CN-106561712 translation, A core-shell structure nanometre zinc oxide. (Year: 2017).*
International Search Report (ISR) issued Nov. 27, 2018 in International (PCT) Application No. PCT/JP2018/032677.
International Preliminary Report on Patentability issued Mar. 10, 2020 in International (PCT) Patent Application No. PCT/JP2018/032677.

(Continued)

*Primary Examiner* — Snigdha Maewall
(74) *Attorney, Agent, or Firm* — Wenderoth, Lind & Ponack, L.L.P.

(57) ABSTRACT

To provide an antimicrobial/antiviral composition having an excellent immediate effect while the content of monovalent copper compound is low.

The antimicrobial/antiviral composition includes: a resin; an antimicrobial/antiviral agent containing monovalent copper compound microparticles coated with a dispersant; and a hydrophilic compound that is dispersed in the resin and is immiscible with the resin.

14 Claims, No Drawings

(56) References Cited

FOREIGN PATENT DOCUMENTS

| | | | |
|---|---|---|---|
| JP | 2014-122457 | | 7/2014 |
| JP | 2014-519504 | | 8/2014 |
| JP | 2015-205998 | | 11/2015 |
| JP | 106561712 | * | 5/2016 |
| JP | 2016069381 A | * | 5/2016 |
| JP | 2017-19837 | | 1/2017 |
| JP | 6073520 | | 2/2017 |
| SG | 194862 | | 12/2013 |
| TW | I489946 | | 7/2015 |
| TW | I533806 | | 5/2016 |
| WO | 2012/086204 | | 6/2012 |
| WO | 2012/162557 | | 11/2012 |
| WO | 2013/176702 | | 11/2013 |
| WO | 2014/091861 | | 6/2014 |
| WO | 2014/132606 | | 9/2014 |
| WO | 2015/168430 | | 11/2015 |

OTHER PUBLICATIONS

Dannong et al. English Translation of Pub. No. CN 106561712; Pub. Date: April 19, 2019). (Year: 2017).
Smalley (Nature, vol. 201, 173-174, Jan. 11, 1964) (Year: 1964).
Nishi, Toshio, “Phase separation behavior of compatible polymer mixtures,” Kobunshi 27(7), pp. 483-488, Jul. 27, 1978.
Machine English translation of Notice of Reasons for Refusal dated Mar. 28, 2023 issued in corresponding Japan Patent Application No. 2019-539712.

* cited by examiner

ANTIMICROBIAL/ANTIVIRAL COMPOSITION

TECHNICAL FIELD

The present invention relates to an antimicrobial/antiviral composition, and an antimicrobial/antiviral coating and antimicrobial/antiviral resin member using the composition.

BACKGROUND ART

Recently, new viral infections have increasingly become threatening. For instance, infections caused by virus such as SARS (severe acute respiratory syndrome), norovirus, and avian influenza virus have prevailed. Meanwhile, Ebola hemorrhagic fever prevailed in West Africa in 2013. According to announcement of the World Health Organization (WHO), among 27,550 infection cases including suspected infection 11,235 of dead cases have been reported by 2015.

In addition, norovirus and/or influenza infections in institutions such as hospitals and nursing homes and nosocomial infection due to drug-resistant bacteria such as MRSA have also prevailed. As a result, urgent countermeasures against the infections should be implemented.

In view of such a background, products should be developed that can easily impart a potent function of inactivating viruses and/or bacteria.

To provide a solution to the problems, the following has been developed, including an antiviral spray agent (Patent Literature 1) in which monovalent copper compound microparticles are suspended in a dispersant; an antiviral coating (Patent Literature 2) in which monovalent copper compound microparticles are added to a binder resin; an antimicrobial composition (Patent Literature 3) in which an antiviral agent having copper iodide microparticles coated with a functionalization agent is added; fiber (Patent Literature 4) in which platinum particles having an antiviral property are fixed to a fiber surface by soaking fiber in a platinum nano-colloid aqueous solution; and an antimicrobial/antiviral polymer material (Patent Literature 5) in which copper oxide and cuprous oxide are included.

CITATION LIST

Patent Literature

Patent Literature 1: JP 2010-239897 A
Patent Literature 2: JP 2010-168578 A
Patent Literature 3: JP 2014-519504 A
Patent Literature 4: JP 2014-122457 A
Patent Literature 5: JP 5457504 B2

SUMMARY OF INVENTION

Technical Problem

Unfortunately, the problem in the antiviral spray agent of Patent Literature 1 is that monovalent copper compound microparticles remain at the sprayed site after spraying and the antiviral effect thus persists; however, once the monovalent copper compound microparticles are removed by cleaning, the antiviral spray agent has to be re-sprayed. The problem in the antiviral coating of Patent Literature 2 is that although the antiviral effect is high, this high antiviral effect is unlikely to be exerted unless a large volume of monovalent copper compound is dispersed and filled; on the other hand, if a large volume of monovalent copper compound is dispersed or dissolved, characteristics such as coating film strength and tight adhesion deteriorate.

In addition, the problem in the antimicrobial composition of Patent Literature 3 is that although the antimicrobial effect is high, it takes a very long time, for example, from several hours to a day to exert effect, and as a result of which the composition lacks an immediate effect. In addition, long-term storage causes a monovalent copper compound to be oxidized, thereby decreasing the antimicrobial effect. Further, the problem in the fiber in which platinum particles are fixed on the surface thereof according to Patent Literature 4 is that there is an antiviral effect, but the immediate effect of inactivating viruses in a short period of time is poor. Furthermore, the problem in the antimicrobial/antiviral polymer material of Patent Literature 5 is that no effect is exerted unless antimicrobial/antiviral particles are projected from the polymer surface. Besides, to exert the effect in a short period of time, the number of particles to be projected has to be increased. As a result, there is a need to increase the number of antimicrobial/antiviral particles included in the polymer material.

Here, to solve the above problems, it is an object of the present invention to provide an antimicrobial/antiviral composition having an excellent immediate effect even when the content of monovalent copper compound is low as well as an antimicrobial/antiviral coating and an antimicrobial/antiviral resin member.

Solution to Problem

Specifically, the first aspect of the invention is an antimicrobial/antiviral composition including: a resin; an antimicrobial/antiviral agent including monovalent copper compound microparticles coated with a dispersant; and a hydrophilic compound that is dispersed in the resin and is immiscible with the resin.

Meanwhile, the second aspect of the invention is the antimicrobial/antiviral composition according to the first aspect of the invention, wherein the dispersant is an inorganic compound.

In addition, the third aspect of the invention is the antimicrobial/antiviral composition according to the first or second aspect of the invention, wherein the copper compound microparticles include at least one of cuprous oxide or copper iodide.

In addition, the fourth aspect of the invention is an antimicrobial/antiviral coating including the antimicrobial/antiviral composition according to any one of the first to third aspects of the invention, wherein a contribution of polar component to surface free energy of coating film formed by drying and/or curing is 2.0% or higher and 40.0% or lower.

In addition, the fifth aspect of the invention is an antimicrobial/antiviral resin member including the antimicrobial/antiviral composition according to any one of the first to third aspects of the invention, wherein a contribution of polar component to surface free energy of the antimicrobial/antiviral resin member is 2.0% or higher and 40.0% or lower.

In addition, the sixth aspect of the invention is the antimicrobial/antiviral resin member according to the fifth aspect of the invention, wherein the antimicrobial/antiviral resin member is a molding.

In addition, the seventh aspect of the invention is the antimicrobial/antiviral resin member according to the fifth aspect of the invention, wherein the antimicrobial/antiviral resin member is fiber.

In addition, the eighth aspect of the invention is a method of producing the antimicrobial/antiviral composition according to any one of the first to third aspects of the invention, including the steps of: mixing the resin and the hydrophilic compound to give a mixture; and mixing the mixture and the copper compound microparticles.

In addition, the ninth aspect of the invention is a method of producing the antimicrobial/antiviral resin member according to the sixth aspect of the invention, including the steps of: mixing the resin and the copper compound microparticles to give a first mixture; mixing the resin and the hydrophilic compound to give a second mixture; and mixing the first mixture and the second mixture.

Advantageous Effects of Invention

According to the invention, a hydrophilic compound is dispersed in the resin of the antimicrobial/antiviral composition. Consequently, the hydrophilic compound is dispersed in a coating film of coating containing the antimicrobial/antiviral composition and/or a resin of resin member containing the antimicrobial/antiviral composition. As a result, the contribution of polar component to surface free energy on a surface of the coating film or the resin member is increased. Accordingly, bacteria and/or viruses having both a hydrophilic group and a hydrophobic group are readily spread and adsorbed on the surface of the coating film or the resin member. This can provide a member having an excellent immediate effect even when the concentration of monovalent copper compound microparticles is low. In addition, because the monovalent copper compound microparticles are coated with a dispersant, aggregation of the copper compound microparticles in the resin can be prevented. Thus, the copper compound microparticles can be efficiently in contact with bacteria and/or viruses. Further, because the hydrophilic compound present in the resin readily adsorbs moisture content in the air, a humidity and/or room temperature fluctuation hardly causes an adsorbed moisture content change. This makes it possible to continue eliciting high antimicrobial/antiviral performance.

DESCRIPTION OF EMBODIMENTS

Hereinafter, an antimicrobial/antiviral composition according to an embodiment of the invention will be described in detail.

An antimicrobial/antiviral composition according to an embodiment of the invention includes: a resin as a main ingredient; an antimicrobial/antiviral agent containing monovalent copper compound microparticles coated with a dispersant (hereinafter, also simply referred to as copper compound microparticles); and a hydrophilic compound that is dispersed in the resin and is immiscible with the resin.

First, ingredients included in the antimicrobial/antiviral composition according to this embodiment are described. Examples of the hydrophilic compound contained in the antimicrobial/antiviral composition of this embodiment include: water-soluble synthetic polymers such as polyvinyl alcohol (PVA), polyvinylpyrrolidone (PVP), polyethylene oxide (PEO), hydroxypropyl cellulose (HPC), polyethylene glycol (PEG), polyacrylamide (PAAM), polyacrylic acid (PAA), sodium polyacrylate, polyethyleneimine; and carboxymethyl starch, dialdehyde starch, alginate, polystyrene sulfonate, carboxymethyl cellulose (CMC), polysaccharides, a polyoxyethylene-polyoxypropylene copolymer, poly-N-alkyl acrylamide, hydroxyethyl cellulose, poly-N-isopropyl acrylamide (PNIAAm), chondroitin sulfate, dextran sulfate, dermatan sulfate, a methyl vinyl ether-maleic anhydride copolymer, an ethylene-vinyl acetate copolymer, and an acrylamide-acrylate copolymer such as a dimethylacrylamide-glycidyl methacrylate copolymer.

The hydrophilic compound is characterized in that the hydrophilic compound is immiscible with the below-described resin as a main ingredient of the antimicrobial/antiviral composition and is formed as an independent discontinuous phase in, for instance, a spherical sea-island form, a lamellar form, or a cylindrical form. The discontinuous phase of hydrophilic compound is intermixed in the resin as a main ingredient of the antimicrobial/antiviral composition of this embodiment and a phase-separated structure is formed. When the antimicrobial/antiviral composition is applied to a coating, the above makes the surface of a coating film hydrophilic after the coating is dried or cured. Alternatively, when the antimicrobial/antiviral composition is applied to a resin member, the above makes the surface of the resin member hydrophilic. These results are characterized in that as described below, how well viruses and/or microbial cells spread on the above surface is enhanced and the antimicrobial/antiviral effect is thus improved.

Here, the phase separation in this embodiment is illustrated. In the case of this embodiment, after the resin and the hydrophilic compound are mixed, discontinuous phases (small domains) caused by hydrophilic compound assembly are micro-dispersed in the hydrophobic resin. The hydrophilic compound and the resin are macroscopically uniform but the phase separation occurs microscopically. The size of each discontinuous phase composed of the hydrophilic compound is said to be typically 1 μm or less. In this embodiment, regardless of whether the hydrophilic compound is in a discontinuous phase (small domain) or a continuous phase in which the discontinuous phases are fused to one another, the hydrophilic compound can be used as long as the hydrophilic compound is present and immiscible with the resin.

Meanwhile, a user can optionally select a resin as a main ingredient of the antimicrobial/antiviral composition of this embodiment if the resin is immiscible with the above hydrophilic compound. Specific examples of this resin will be illustrated in the description of an antimicrobial/antiviral coating and/or an antimicrobial/antiviral resin member using the antimicrobial/antiviral composition.

The antimicrobial/antiviral composition of this embodiment is characterized by further including monovalent copper compound microparticles as an antimicrobial/antiviral agent that is a substance capable of inactivating either microbial cells (e.g., fungi, bacteria) or viruses or the both. Specific examples of the monovalent copper compound that can be preferably used include cuprous oxide and a copper halide (in particular, copper iodide) from the viewpoints of temporal stability and effect sustainability. The shape of the antimicrobial/antiviral agent is not particularly limited and examples can include a powder form, a paste form, a liquid form, and a microparticle form.

The particle size of the antimicrobial/antiviral agent (copper compound microparticles) is not particularly limited and can be optionally set by a person skilled in the art. Here, it is preferable that the average particle size is 1 nm or larger and less than 1 μm. This is because if the average particle size is less than 1 nm, the substance is unstable; and if the average particle size is 1 μm or larger, the antimicrobial/antiviral effect is lower than the case of less than 1 μm and stability of the antimicrobial/antiviral composition during storage deteriorates. Note that the average particle size herein refers to a volume-average particle size. The volume-average particle size can be measured on the basis of, for instance, a laser Doppler method (dynamic/electrophoretic light scattering). The measuring device is not particularly limited and a ζ-potential/particle size-measuring system (manufactured by OTSUKA ELECTRONICS Co., LTD.), for instance, may be used.

Further, the antimicrobial/antiviral agent in this embodiment is characterized in that the surface of copper compound microparticle is coated with a dispersant so as to prevent aggregation of the antimicrobial/antiviral agent. As the dispersant, an organic compound such as a polymer-based dispersant, a surfactant, or a plasticizer or an inorganic compound such as a metal soap may be used, if appropriate. In this embodiment, an inorganic compound is preferably used because the inorganic compound can increase contact with bacteria and/or viruses and the antimicrobial/antiviral effect is thus readily exploited. For instance, the ζ-potential of inorganic compound such as zirconia, aluminum oxide, or titanium oxide is a positive potential at pH 7. Meanwhile, viruses, in general, possess a negative potential. Accordingly, by coating copper compound microparticles with the inorganic compound microparticles, contact between the antimicrobial/antiviral agent and viruses can be increased, readily resulting in expression of the antiviral effect. Further, when the copper compound microparticles are coated with the inorganic compound, the copper compound microparticles are unlikely to be oxidized, so that the antimicrobial/antiviral effect can persist. The "coat" herein refers to the presence of a dispersant on at least a part of a surface of each copper compound microparticle.

A metal soap as the dispersant is a microparticle, excels in dispersion in a resin, and imparts adequate smoothness to the resin. For the metal soap, a fatty acid such as stearic acid, oleic acid, ricinoleic acid, octylic acid, and lauric acid; and a metal such as lithium, magnesium, calcium, barium, and zinc are used.

Examples of the inorganic compound include, in addition to the metal soap, a metal hydroxide, a metal oxide, and a metal peroxide. Examples of the metal hydroxide include aluminum hydroxide, zirconium hydroxide, zinc hydroxide, and iron hydroxide. Examples of the metal oxide include magnesium oxide, barium oxide, calcium oxide, aluminum oxide, tin oxide, titanium oxide, zinc oxide, zirconium oxide, iron oxide, and tungsten oxide. Examples of the metal peroxide include barium peroxide, titanium peroxide, and calcium peroxide. Note that these inorganic compounds may be used singly or may be in combination of two or more kinds. The sizes of inorganic compound microparticles are not particularly limited and the average particle size is preferably 1.0 nm or larger and 300 nm or less.

The virus inactivation mechanism by the monovalent copper compound is not necessarily clear at the moment. However, it seems that when a monovalent copper compound comes into contact with water content in the air or in droplets, a monovalent copper ion is eluted; the eluted monovalent copper ion comes into contact with a virus to release an electron; at that time, the generated reactive species give the virus some damage to inactivate the virus.

Regardless of the kind of genome and/or the presence or absence of envelope, various viruses are listed for the viruses capable of being inactivated by the antimicrobial/antiviral composition of this embodiment. Examples of the viruses include rhinovirus, poliovirus, foot-and-mouth disease virus, rotavirus, norovirus, enterovirus, hepatovirus, astrovirus, sapovirus, hepatitis E virus, influenza virus A, B or C, parainfluenza virus, mumps virus (mumps), measles virus, human metapneumovirus, RS virus, nipahvirus, hendravirus, yellow fever virus, dengue virus, Japan encephalitis virus, West Nile virus, hepatitis B or C virus, eastern and western equine encephalitis virus, Onyong-nyong virus, rubella virus, Lassa virus, Junin virus, Machupo virus, Guanarito virus, Sabia virus, Crimean-Congo hemorrhagic fever virus, sandfly fever/hantavirus, hantavirus, Sin Nombre virus, rabies virus, Ebola virus, Marburg virus, bat lyssavirus, human T cell leukemia virus, human immunodeficiency virus, human coronavirus, SARS coronavirus, human parvovirus, polyoma virus, human papilloma virus, adenovirus, herpes virus, varicella-zoster virus, EB virus, cytomegalovirus, smallpox virus, monkeypox virus, cowpox virus, molluscipoxvirus virus, parapox virus, and zika virus.

In addition, microbial cells capable of being inactivated by the antimicrobial/antiviral composition according to this embodiment are not particularly limited and various bacteria can be listed regardless of gram-positive or -negative, aerobic, or anaerobic characteristics and so on. Examples include *Escherichia coli, Staphylococcus aureus, Staphylococcus epidermidis, Streptococcus, Streptococcus pneumoniae, Haemophilus influenzae, Haemophilus pertussis, Salmonella enteritidis, Klebsiella pneumoniae, Pseudomonas aeruginosa, Vibrio, Salmonella enterica, Vibrio cholerae, Shigella dysenteriae, Bacillus anthracis, Mycobacterium tuberculosis, Clostridium botulinum, Clostridium tetani*, and *Streptococcus.*

Next, an example of a method of producing the antimicrobial/antiviral composition according to this embodiment will be specifically described.

First, a resin, which is a main ingredient of the above-described antimicrobial/antiviral composition, is mixed with a hydrophilic compound. For the mixing procedure, it is possible to use a mixer, a homogenizer, a bead mill, a ball mill, a three-roll mill, or another instrument. Depending on the purpose, the antimicrobial/antiviral composition of this embodiment may be optionally blended with an additional additive(s) (e.g., a flame retardant, a flame retardant aid, a stabilizer, a UV absorber, a plasticizer, and/or a lubricant), a pigment, a filler, and/or another ingredient.

Next, the copper compound microparticles used in this embodiment are ground to particles in nano-order by using, for instance, a jet mill, a hammer mill, a ball mill, a vibration mill, or a bead mill. The grinding procedure is not particularly limited and both dry and wet processes may be utilized. At this time, an inorganic compound for coating the copper compound microparticles is added. After the inorganic compound is added, the copper compound microparticles and the inorganic compound are in contact with each other and are crushed. Then, the inorganic compound with a smaller particle size occurs. At the same time, electrostatic attraction causes the inorganic compound to be attached to the surface of each copper compound microparticle. Then, an antimicrobial/antiviral agent is obtained in which the copper compound microparticles are coated with the inorganic compound. This antimicrobial/antiviral agent and a mixture of a resin and a hydrophilic compound are mixed to yield an antimicrobial/antiviral composition.

The procedure for coating the surface of each copper compound microparticle with a metal hydroxide, a metal oxide, or a metal peroxide as the inorganic compound may include: dispersing copper compound microparticles in an aqueous solution containing such a dissolved metal compound so as to chemically adsorb the metal compound on the surface of each copper compound microparticle; or dispersing copper compound microparticles in a solvent containing a dispersed metal compound so as to precipitate the metal compound on the surface of each copper compound microparticle.

Examples of another procedure include a mechanochemical procedure. This procedure is a process for embedding child particles into mother particles by applying strong pressure to core mother particles (in this embodiment, copper compound microparticles) and child particles (in this embodiment, an inorganic compound) covering the mother particles by using a rolling ball mill, a high-speed rotary grinder, a high-speed flow impact grinder, a medium-agitating mill, or a mechanical fusion device. When this procedure is used, it is preferable that the copper compound microparticles, which are mother particles, should be beforehand ground to a desired particle size by the above process.

Examples of an apparatus allowing for preparation of the mother particles and the child particles include: a rotary blade type such as a super mixer from KAWATA MFG. CO., LTD.; and a shaker type such as a paint shaker from ASADA IRON WORKS. CO., LTD., a Hybridization System (registered trademark) manufactured by NARA MACHINERY CO., LTD., a Mechanofusion (registered trademark) from Hosokawa Micron Group, or a medium flow dryer. However, the apparatus is not particularly limited to these devices. The devices allowing for both grinding and coating of child particles may be used, including an automated mortar, a high-speed rotary grinder, a high-speed flow impact grinder, or a rolling ball mill. In this case, it is unnecessary to beforehand crush copper compound microparticles which are mother particles.

Next, an antimicrobial/antiviral coating using the antimicrobial/antiviral composition of this embodiment will be described in detail.

The antimicrobial/antiviral coating of an embodiment of the invention includes the above-mentioned antimicrobial/antiviral composition. Then, the antimicrobial/antiviral coating of this embodiment is characterized in that in a dried and/or cured state (i.e., in a coating film state), the contribution (hereinafter, referred to as polar contribution Rγp) of polar component γsp to surface free energy γs is 2.0% or higher and 40.0% or lower.

Now, the polar contribution Rγp of coating film when the antimicrobial/antiviral coating of this embodiment is in a dried and/or cured state will be illustrated.

The surface free energy γs refers to surplus energy of a molecule (or an atom) present on a solid surface or liquid surface when compared to that of a molecule (or an atom) present inside the solid or liquid. The surface free energy γs is defined by the following Formula (1); and the polar contribution Rγp is defined by the following Formula (2). In the following Formula (1), γsp is the polar component in the surface free energy γs and γsd is the non-polar component in the surface free energy γs. In addition, the surface free energy γs, the non-polar component γsd, and the polar component γsp are values when the antimicrobial/antiviral coating of this embodiment is in a dried and/or cured state.

[Expression 1]

$$\gamma s = \gamma sd + \gamma sp \tag{1}$$

$$R\gamma p = \frac{\gamma sp}{\gamma s} \times 100 \tag{2}$$

When the surface free energy γs is measured, a surface of coating film, which is subject to measurement, in a dried and/or cured state is coated with a measurement liquid (each of water or diiodomethane is used) to measure the contact angle (θ) of each measurement liquid. The value obtained for the contact angle and the following Formula (3) are used to calculate the polar component γsp and the non-polar component γsd.

[Expression 2]

$$(1+\cos\theta) \times \frac{\gamma L}{4} = \frac{(\gamma sd \times \gamma Ld)}{\gamma sd + \gamma Ld} + \frac{(\gamma sp \times \gamma Lp)}{\gamma sp + \gamma Lp} \tag{3}$$

θ: Contact angle of measurement liquid on a surface of coating film in a dried and/or cured state γL: Surface tension of measurement liquid (water or diiodomethane)

γLd: Non-polar component of surface free energy of measurement liquid (water or diiodomethane)

γLp: Polar component of surface free energy of measurement liquid (water or diiodomethane)

γsd: Non-polar component of surface free energy of coating film in a dried and/or cured state γsp: Polar component of surface free energy of coating film in a dried and/or cured state Regarding the two measurement liquids (water and diiodomethane), the surface tension γL, the non-polar component γLd, and the polar component γLp may be measured beforehand. When simultaneous equations, in which the contact angles θ of the two measurement liquids are each assigned in the above Formula (3), are solved, the polar component γsp and the non-polar component γsd can be calculated. When the resulting non-polar component γsd and polar component γsp are assigned to the above Formula (1), the surface free energy γs can be calculated. Then, this surface free energy γs and the polar component γsp may be assigned to the above Formula (2) to calculate the polar contribution Rγp.

The surface free energy γs may be comparable. Even in this case, as the polar contribution Rγp increases, the antimicrobial/antiviral effect becomes higher. The rationale is not necessarily clear at the moment. However, it seems that as the polar contribution Rγp increases, microbial cells and/or viruses attached to the coating film surface spread more readily. This causes the antimicrobial/antiviral agent to easily contact the microbial cells and the viruses, thereby enhancing the antimicrobial/antiviral effect.

In addition, a material to be coated with the antimicrobial/antiviral coating of this embodiment may have a high intrinsic polar contribution Rγp. Even in this case, the antimicrobial/antiviral effect is not increased unless the hydrophilic compound is included. The rationale is unclear, but it seems that if the hydrophilic compound is not included, microbial cells and viruses are unlikely to spread on the coating film surface and are thus not readily in contact with the antimicrobial/antiviral agent.

The polar contribution Rγp of coating film in a dried and/or cured state may be adjusted by how much the hydrophilic compound is added. In order to increase the antimicrobial effect and the antiviral effect, it is preferable that the polar contribution Rγp of a coating film is 2.0% or higher and 40.0% or lower. More preferably, the polar contribution Rγp is 5% or higher and 30% or lower.

When the polar contribution Rγp is less than 2.0%, the antimicrobial effect and the antiviral effect are insufficient compared to the case where the polar contribution Rγp is 2.0% or higher. To improve the antimicrobial effect and the antiviral effect, it is more preferable that the polar contribution Rγp is 5% or higher. Meanwhile, when the polar contribution Rγp exceeds 40%, the antimicrobial effect and the antiviral effect are not much elevated compared to the case where the polar contribution Rγp is 40% or lower. Because of the above, it is preferable that the polar contribution Rγp is 40% or lower.

Note that the dried state of an antimicrobial/antiviral coating herein means a state in which when the antimicrobial/antiviral coating is subjected to drying treatment and so on, the antimicrobial/antiviral coating residual content is substantially in a solid state. In addition, the cured state of an antimicrobial/antiviral coating means a state in which when the antimicrobial/antiviral coating is coated/dried, etc., to form a coating film, dust, etc., may be attached to the surface thereof; and even in this case, the dust, etc., is not incorporated into the coating film. The attached dust, etc., may be easily removed by blowing the air. Further, the cured state of an antimicrobial/antiviral coating herein indicates a state of at least a surface of a coating film and does not necessarily means that the inside of the coating film is completely cured.

Meanwhile, a user can optionally select a resin as a base of the antimicrobial/antiviral coating of this embodiment if the resin is immiscible with the above-mentioned hydrophilic compound. Specific examples used include thermoplastic resins, thermosetting resins, and radiation curable resins that can be cured by irradiation with an electron beam and/or UV light, etc. These resins may be in combination of two or more kinds.

Examples of the thermoplastic resins include: olefin-based resins such as polyethylene, polypropylene, chlorinated polyethylene; polystyrene resin, polyvinyl acetate resin, polyurethane resin, polyester resin; copolymers containing acrylic acid, acrylic acid ester, methacrylic acid, or methacrylic acid ester as a backbone; acrylic styrene resin, fluorine-based resin; cellulose-based resins such as nitrocellulose and ethyl cellulose; drying oil such as castor oil, linseed oil, or Tung oil; and natural resins such as shellac and copal. In addition, examples of the thermosetting resins include phenol resin, epoxy resin, melamine resin, urea resin, unsaturated polyester resin, acrylic silicone resin, alkyd resin, polyurethane resin, thermosetting acrylic resin, and thermosetting polyimide resin.

Further, the radiation (e.g., an electron beam or UV light) curable resins are monomers, oligomers, or polymers. From the viewpoints of being capable of increasing the post-cure crosslink density, enhancing the effect of improving the surface hardness, and enhancing the effect of improving the transparency, preferable examples include multifunctional (meth)acrylate compounds such as multifunctional (meth) acrylate monomers, multifunctional (meth)acrylate oligomers, or multifunctional (meth)acrylate polymers. In addition, a photopolymerization initiator may be added depending on the needs. Examples of the photopolymerization initiator include anthraquinone, acetophenone, isopropyl benzoin ether, isobutyl benzoin ether, ethylanthraquinone, carbazole, xanthone, 4-chlorobenzophenone, o-benzoyl methylbenzoate, 2,4-diethylthioxantone, 2-chlorothioxanthone, 2,2-dimethoxy-1,2-diphenylethan-1-one, p-dimethylamino benzoic acid isoamyl ester, p-dimethylamino benzoic acid ethyl ester, 2,2-dimethoxy-2-phenylacetophenone, 1-hydroxycyclohexyl phenyl ketone, 2-hydroxy-2-methyl-1-phenyl-propane-1-one, 1-hydroxycyclohexyl phenyl ketone, 2-benzyl-2-dimethylamino-1(4-morpholinophenyl)-butanone-1, bis (2,4,6-trimethylbenzoyl)-phenylphosphine oxide, methylbenzyl formate, fluorenone, benzophenone, benzaldehyde, fluorene, triphenylamine, Michler's ketone, 3-methylacetophenone, 2-methyl-1-1[4-(methylthio)phenyl]-2-morpholino-propane-1-one, 2,4,6-trimethylbenzoyl diphenylphosphine oxide, and bis-(2,6-dimethylbenzoyl)2, 4,4-trimethylpentylphosphine oxide.

The antimicrobial/antiviral coating of this embodiment may be used to coat each different target member to give the antimicrobial/antiviral performance.

Examples of the target member include fiber structures, films, and sheets. Examples of the fiber structures capable of having a coating film include woven fabrics and nonwoven fabrics. Specific application examples of them include masks, filters for air conditioners, filters for air cleaners, filters for vacuum cleaners, filters for ventilators, vehicle filters, air conditioning filters, clothing, protective clothing, bedding, window screen nets, and henhouse nets. Each fiber structure may include a polymer material (e.g., polyester, polyethylene, polypropylene, polyvinyl chloride, polyethylene terephthalate, polybutylene terephthalate, polytetramethylene terephthalate, nylon, acryl, polytetrafluoroethylene, polyvinyl alcohol, Kevlar, polyacrylic acid, polymethyl methacrylate, rayon, Cupra, Tencel, polynosic, acetate, triacetate, cotton, hemp, wool, silk, bamboo) and/or fiber containing a metal (e.g., aluminum, iron, stainless steel, brass, copper, tungsten, titanium).

Examples of materials for the films include those containing a resin such as polyester, polyethylene, polypropylene, polyamide, polyvinyl chloride, polyvinylidene fluoride, polyvinyl alcohol, polyvinyl acetate, polyimide, polyamide imide, polytetrafluoroethylene, or an ethylene tetrafluoride-ethylene copolymer.

Examples of the sheets include polymer-made sheets (e.g., polycarbonate resin sheets, film vinyl chloride sheets, fluorine resin sheets, polyethylene sheets, silicone resin sheets, nylon sheets, ABS sheets, urethane sheets) or sheets containing a metal (e.g., titanium, aluminum, stainless steel, magnesium, brass).

Specific application examples of the films and/or sheets include wallpapers and windows, ceilings, vehicle seats, doors, window shades, chairs, sofas, floor materials, facilities in which microbial cells and/or viruses are involved, train/vehicle interior materials, interior materials for buildings such as hospitals, agricultural materials, or roller shutters. They are applicable to various fields.

Further, the antimicrobial/antiviral coating of this embodiment may be directly applied to a panel, a construction decorative material, an interior material, a writing instrument, a handrail, a strap, a phone, a toy, or a molding such as a door handle to form a film (coating film). Examples of the polymer-made molding include moldings formed by using ABS, polycarbonate, nylon, polypropylene, polystyrene, polyacetal, polyester, or the like. In addition, examples of the metal molding include moldings formed by using aluminum, zinc, magnesium, brass, stainless steel, titanium, or the like. The surface of the metal molding may have a metal thin film, a coating, or a printing, etc., prefabricated by electroplating or electroless plating.

Next, an example of a method of producing the antimicrobial/antiviral coating according to this embodiment will be specifically described.

Like the method of producing the above-described antimicrobial/antiviral composition, a mixture obtained by mixing a resin and a hydrophilic compound and a ground antimicrobial/antiviral agent (copper compound microparticles coated by a dispersant) are prepared. Then, they are mixed to yield an antimicrobial/antiviral coating of this embodiment. Depending on the purpose, the antimicrobial/ antiviral coating may be optionally blended with an additional additive(s) (e.g., a flame retardant, a flame retardant aid, a stabilizer, a UV absorber, a plasticizer, and/or a lubricant), a pigment, a filler, and/or another ingredient.

The following details an antimicrobial/antiviral resin member using the antimicrobial/antiviral composition of the above embodiment.

The antimicrobial/antiviral resin member according to an embodiment of the invention includes the above-mentioned antimicrobial/antiviral composition. Then, the antimicrobial/antiviral resin member of this embodiment is characterized in that the contribution (hereinafter, referred to as polar contribution $R\gamma p$) of polar component $\gamma sp$ to surface free energy $\gamma s$ of the resin member is 2.0% or higher and 40.0% or lower.

The polar contribution $R\gamma p$ of the antimicrobial/antiviral resin member of this embodiment is defined by the above Formulas (1) to (3) as described regarding the above-mentioned antimicrobial/antiviral coating. To obtain the antimicrobial/antiviral resin member, a solvent may be removed and dried by heating and reheating and/or irradiation with infrared light, UV light, an electron beam, a $\gamma$ ray, or the like may cause curing. Because of this, in the above Formulas (1) and (2), the surface free energy $\gamma s$, the non-polar component $\gamma sd$, and the polar component $\gamma sp$ are values when the antimicrobial/antiviral resin member of this embodiment is in a dried and/or cured state. In addition, in the above Formula (3), a surface of the antimicrobial/antiviral resin member is used instead of the coating film surface.

Like the polar contribution $R\gamma p$ of coating film of the antimicrobial/antiviral coating, when the polar contribution $R\gamma p$ is less than 2.0%, the antimicrobial/antiviral effect is insufficient when compared to the case where the polar contribution $R\gamma p$ is 2.0% or higher. Meanwhile, when the polar contribution $R\gamma p$ exceeds 40.0%, the antimicrobial/antiviral effect is not much elevated compared to the case where the polar contribution $R\gamma p$ is 40.0% or lower. Because of the above, it is preferable that the polar contribution $R\gamma p$ is 40.0% or lower. The polar contribution $R\gamma p$ of the antimicrobial/antiviral resin member is preferably 5.0% or higher and 30.0% or lower and more preferably 10.0% or higher and 20.0% or lower. To improve the antimicrobial/antiviral effect, the polar contribution $R\gamma p$ is preferably 5.0% or higher and more preferably 10.0% or higher.

The content of the hydrophilic compound in the antimicrobial/antiviral resin member of this embodiment is not particularly limited and can be set by those skilled in the art, if appropriate. The content is preferably 0.01 mass % or higher and 50.0 mass % or lower with respect to 100 mass % of the antimicrobial/antiviral resin member. When the content of the hydrophilic compound is less than 0.01 mass %, the polar contribution $R\gamma p$ of the antimicrobial/antiviral resin member cannot be adequately increased when compared to the case where the content of the hydrophilic compound is 0.01 mass % or higher. In addition, when the content of the hydrophilic compound exceeds 50.0 mass %, the strength of the antimicrobial/antiviral resin member is lower than that of the case where the content of the hydrophilic compound is 50.0 mass % or lower. Further, when the content of the hydrophilic compound is 0.01 mass % or higher and 50.0 mass % or lower and the content of the hydrophilic compound is larger than the content of the antimicrobial/antiviral agent, the strength of the antimicrobial/antiviral resin member may be decreased. Thus, it is preferable that the content of the hydrophilic compound is below the content of the antimicrobial/antiviral agent.

The base resin for the antimicrobial/antiviral resin member is not particularly limited as long as the resin is immiscible with the above-stated hydrophilic compound. Examples include: thermoplastic resins such as polyester resin, polyethylene resin, polypropylene resin, polystyrene resin, ABS resin, AS resin, EVA resin, polymethylpentene resin, polyvinyl chloride resin, polyvinylidene chloride resin, methyl polyacrylate resin, polyvinyl acetate resin, polyamide resin, polyimide resin, polycarbonate resin, polyethylene terephthalate resin, polytetramethylene terephthalate resin, polybutylene terephthalate resin, polyacetal resin, polyacrylate resin, polysulfone resin, nylon resin, acrylic resin, polyvinylidene fluoride resin, polyethylene tetrafluoroethylene resin, polytetrafluoroethylene resin, polyvinyl alcohol resin, Kevlar (registered trademark), and polymethyl methacrylate resin; silicone resins; styrene-based elastomers such as polystyrene elastomers; olefin-based elastomers such as polyethylene elastomers or polypropylene elastomers; polyurethane-based elastomers such as polyurethane elastomers; thermoplastic elastomers such as vinyl chloride-based elastomers, polyester-based elastomers, or nylon-based elastomers; and rayon, Cupra (registered trademark), Tencel (registered trademark), polynosic, acetate, and triacetate. These resins may be in combination of two or more kinds.

Regarding the hydrophilic compound in the antimicrobial/antiviral composition when used for the antimicrobial/antiviral resin member of this embodiment, a liquid hydrophilic compound may be used. In this case, foaming, etc., may occur. Thus, it is preferable to use a solid hydrophilic compound.

Further, the antimicrobial/antiviral resin member of this embodiment may contain the above-stated antimicrobial/antiviral composition. As long as the purpose of the invention of the present application can be achieved, an additional ingredient(s) may be included and the shape thereof is also not limited.

For instance, the antimicrobial/antiviral resin member of this embodiment may be a molded product and may be shaped like a sheet, a film, fiber, a cloth, a mesh (net structure), a honeycomb, a nonwoven fabric, or the like. When the antimicrobial/antiviral resin member is fibrous, nano-fiber (fiber with an average fiber diameter of 5 nm or larger and less than 1 μm) may be allowed. Note that the average fiber diameter refers to the average of the fiber diameters of plural nano-fibers. The fiber diameter of nano-fiber may be measured, using a microscope, by examining a nano-fiber image. Specifically, multiple nano-fibers are observed with an electron microscope, etc., and some of the nano-fibers are selected at random in the resulting observed image. Then, image processing software is used to measure the fiber diameter of each nano-fiber and the average of the respective fiber diameters can be calculated.

Next, an example of a method of producing the antimicrobial/antiviral resin member of this embodiment is specifically described.

A first master batch pellet (first mixture), which is a resin pellet containing the antimicrobial/antiviral agent, is prepared and a second master batch pellet (second mixture), which is obtained by mixing a hydrophilic compound and a base resin pellet at a prescribed weight ratio, is prepared. Next, the first master batch pellet and the second master batch pellet are melted and kneaded. Then, the kneaded material is formed as a predetermined shape to obtain an antimicrobial/antiviral resin member of this embodiment. The first master batch pellet and the second master batch pellet are separately prepared and are then melted and kneaded. This makes it possible to avoid contact between the antimicrobial/antiviral agent and the hydrophilic compound in the antimicrobial/antiviral resin member.

For instance, the first master batch pellet is prepared as follows. First, ground copper compound microparticles and a dispersant are mixed. After the surface of each copper compound microparticle is coated with the dispersant to produce an antimicrobial/antiviral agent, this antimicrobial/antiviral agent and a resin pellet are mixed. Then, a kneading extruder is used to disperse the antimicrobial/antiviral agent in the resin pellet. Alternatively, ground copper compound microparticles and a dispersant are mixed with a resin pellet. Next, a kneading extruder is used and the dispersant is so attracted to the surrounding of the copper compound microparticles during kneading. As a result, the copper compound microparticles are coated with the dispersant to produce an antimicrobial/antiviral agent. This antimicrobial/antiviral agent is also dispersed in the resin pellet. After the kneaded material is cooled, a pelletizer is used to finely cut the antimicrobial/antiviral agent-containing resin. In this way, the first master batch pellet containing the antimicrobial/antiviral agent is obtained. Note that the proportion (concentration) of the antimicrobial/antiviral agent at the time of manufacture of the first master batch pellet may be set by those skilled in the art, if appropriate.

For instance, the second master batch pellet is prepared as follows. First, a hydrophilic compound and a resin pellet are mixed at a prescribed weight ratio to yield a mixture. Here, as the resin pellet, the same material as the resin pellet used during manufacture of the first master batch pellet is used. The resulting mixture is melted and kneaded to yield the second master batch pellet.

A molding machine is used to mold a material obtained by melting and kneading the first and second master batch pellets. Then, it is possible to obtain an antimicrobial/antiviral resin member in which the antimicrobial/antiviral agent and the hydrophilic compound are dispersed in the base resin.

In addition, when manufactured as a molded product, the antimicrobial/antiviral resin member according to this embodiment can be molded by a process such as injection molding or blow molding.

Note that examples of the antimicrobial/antiviral resin member according to this embodiment include, in addition to the molded product, a sheet-shaped, a film-shaped, a fiber-shaped, a cloth-shaped, a meshed (net structure), a honeycomb-shaped, or a nonwoven fabric-shaped form, etc. The antimicrobial/antiviral resin member can be manufactured in various forms (e.g., a shape, dimension) fit for their usage. When the antimicrobial/antiviral resin member is manufactured like a sheet or film, a T-die process, an inflation process, or the like may be used for the formation. In addition, when the antimicrobial/antiviral resin member is manufactured like fiber, melt spinning, etc., may be used for the formation. Further, when the antimicrobial/antiviral resin member is manufactured like a nonwoven fabric, it can be manufactured by an existing manufacturing process such as spun-bonding.

In addition, the antimicrobial/antiviral resin member according to this embodiment may contain, as an additive(s), for instance, a plasticizer, a desiccant, a curing agent, an antiskinning agent, a leveling agent, an anti-sagging agent, an antifungal, a UV absorber, a heat ray absorber, a lubricant, a surfactant, a thickener, a viscosity modifier, a stabilizer, and/or a drying modifier. These additives may be used singly or may be used in combination of two or more kinds. Further, other antiviral composition, antimicrobial composition, antifungal composition, anti-allergen composition, catalyst, antireflection material, and/or material having heat shield characteristics may be added and used.

The antimicrobial/antiviral resin member of this embodiment is applicable to: fibers; agricultural materials such as house films, tunnel house films; moldings such as trays used in plant factories; panels; construction decorative materials; interior materials; writing instruments; handrails; straps; phones; toys; door handles; stationery such as clear folders or label tapes; sheets; shrinking materials that are contracted when heated; construction decorative materials (e.g., chairs, sofas, exterior wall materials, sashes, doors, window shades, ceiling plates, floor plates, windows); interior materials (e.g., wallpapers, carpets, resin tiles); interior materials for trains or vehicles; clothing; innerwear; socks; gloves; shoe covers; footwear such as shoes; bedding materials (e.g., pajamas, mats, sheets, pillows, pillowcases, blankets, towelkets, futons, futon covers); caps; handkerchiefs; towels; rugs; curtains; filters for air cleaners, air conditioners, ventilators, vacuum cleaners, fans, or the like; various water surface-contacting members (e.g., fishing nets such as fish preserve or fixed nets; filters for water treatment; filters for drinking water; filters for ballast water treatment; in-pipe lining materials; film-shaped members attached, using a bonding agent or adhesive, to surfaces of seashore structures; members bonded, like sheets, to surfaces of ships such as fishing boats or tankers; sheet-shaped members on the inner walls of water intake ports of power plants; pre-filters for water intake ports; inner surfaces of water intake ports; plate coolers; drain pipes; water supply pipes); or fiber structure products (e.g., insect screens, screen printing meshes). Thus, the antimicrobial/antiviral resin member according to this embodiment is a useful member that makes it possible to provide a variety of excellent products in various field.

An example of a method of producing fiber as the antimicrobial/antiviral resin member will be specifically described.

A first master batch pellet, which is a resin pellet containing the antimicrobial/antiviral agent, is prepared and a second master batch pellet, which is obtained by mixing a hydrophilic compound and a resin pellet at a prescribed weight ratio, is prepared. Next, the first master batch pellet and the second master batch pellet are mixed, melted, and kneaded to produce a spinning raw material. Then, the resulting spinning raw material may be subjected to a melt spinning step to obtain fiber in this embodiment. The melt spinning process is not limited to a specific process and a known process may be used. The spinning temperature may be optionally selected from a temperature range fit for fiber material if the range is set such that discharge from a spinneret is possible while the resin viscosity is appropriately low, neither resin deterioration nor thermal decomposition occurs, the spinning step is not markedly unstabilized, and fiber with high strength can be obtained by subsequent stretching processing.

In the melt spinning step, spinning raw material is discharged from a spinneret; the discharged fibrous spinning raw material is cooled and solidified to yield fiber. Specifically, the discharged spinning raw material is cooled to a solidification temperature or lower and solidified in a medium such as the air, water, or glycerol. In the case of water-cooling-type cooling, while heated to about 60° C. and then gradually cooled, fiber does not move at the time of injection into a water tank and can then pass through the water tank. Thus, stability during the cooling is excellent. In the case of air-cooling, the air temperature and the wind speed may be arbitrarily set. However, to suppress the molecular orientation, it is desirable that the wind speed should be low and the temperature is not too low. If the degree of molecular orientation at the cooling time point is high, fiber is not readily stretched when a heating/stretching step is carried out as the next step. Consequently, the antimicrobial/antiviral effect may be unlikely to be obtained.

Then, the solidified fiber is wound. The winding rate may be set to a given rate. In this regard, however, when the winding rate is lower than the free-fall rate of molten unstretched yarn, uniform unstretched yarn is not necessarily obtained, leading to a decrease in stretchability. Note that when a heating/stretching step is carried out as the next step, the solidified yarn is not necessarily wound and may be subjected, as it is, to the heating/stretching step.

Next, the heating/stretching step is described. The heating/stretching step is a step of heating and stretching fiber (unstretched yarn) wound in the spinning step. The heating/stretching step may include multiple stretching steps. When the heating/stretching step includes multiple stretching steps, the stretch factors in the respective stretching steps are multiplied to give a total stretch factor. Note that when the heating/stretching step includes a single stretching step, the stretch factor in this single stretching step is a total stretch factor.

The fiber in this embodiment may be heated and stretched to express much better antimicrobial/antiviral performance and thus can efficiently inactivate bacteria and/or viruses attached to the fiber surface, etc. When the fiber is a monofilament, in particular, the heating and stretching can cause the antimicrobial/antiviral effect to increase. The mechanism of markedly increasing the antimicrobial/antiviral effect by heating and stretching is not necessarily clear at the moment. However, the following rationale may be considered. A surface layer portion of fiber in a molten state during the spinning step is directly cooled and solidified once the cooling begins. Then, the antimicrobial/antiviral agent, which is present in a portion (inner layer portion) inside of the fiber relative to the surface layer portion, is structured such that the agent is not readily in contact with water content outside the fiber. In contrast, the inner layer portion is cooled via the surface layer portion and solidified. Accordingly, the cooling speed of the inner layer portion is lower than the cooling speed of the surface layer portion. This may cause the fiber structure of the surface layer portion to be different from the fiber structure of the inner layer portion. When heating and stretching are carried out under such a state, the stretching is conducted under a heating condition at a glass transition point or higher. This causes the fiber structure of the surface layer portion to be a fiber structure in which the antimicrobial/antiviral agent and water content outside the fiber easily come into contact. On top of that, the heating and stretching make the fiber structure of the surface layer portion close to the fiber structure of the inner layer portion. This seems to impart some effect on the surface charges and/or DNA of bacteria and/or viruses, thereby inactivating them.

The stretching process is not particularly limited and a known stretching process such as hot roll drawing, hot plate drawing, tubular stretching, stretch-blowing, or laser stretching may be optionally adopted. When hot roll drawing is used for the heating and stretching, the rotational speeds of hot rolls, which are combined in multiple stages, are changed. Accordingly, unstretched yarn can be stretched at a high factor.

The stretch factor may be optionally selected depending on the fineness of material to be stretched, and the total stretch factor is set usually to 3.0 or higher and 7.0 or less and preferably 4.0 or higher and 6.0 or less. When the stretch factor is 3.0 or higher and 7.0 or less, the molecule is more oriented to give stronger fiber. When the stretch factor is less than 3.0, the antimicrobial/antiviral effect is lower than that in the case of the stretch factor of 3.0 or higher and the resulting fiber strength is lowered. In addition, when the stretch factor exceeds 7.0, the stretching tension becomes extremely high. This may frequently cause yarn rapture, leading to a decrease in yarn productivity.

Not that the fiber in the antimicrobial/antiviral resin member according to this embodiment may have a core-sheath structure. In this case, the core, for instance, may be formed using a regular resin (antimicrobial/antiviral agent-free resin) and the sheath may be formed using a resin containing the antimicrobial/antiviral agent and/or a hydrophilic compound. This not only can improve the fiber strength, but also provides an advantage such that the content of the antimicrobial/antiviral agent may be decreased. A resin for the core and a resin for the sheath may be the same or different resins.

The shape of cross-section perpendicular to the longitudinal direction of the fiber in the core-sheath structure is not particularly limited, and the cross-sectional shape is preferably circular and the core and the sheath are preferably shaped like concentric circles. The ratio of the area of the core to the area of the sheath in the cross-section perpendicular to the longitudinal direction of the fiber is not particularly limited and may be set by a user, if appropriate.

In addition, the fiber in the antimicrobial/antiviral resin member according to this embodiment may contain, as an additive(s), for instance, a plasticizer, a desiccant, a curing agent, an antiskinning agent, a leveling agent, an anti-sagging agent, an antifungal, a UV absorber, a heat ray absorber, a lubricant, a surfactant, a thickener, a viscosity modifier, a stabilizer, and/or a drying modifier. These additives may be used singly or may be used in combination of two or more kinds. Further, other antiviral composition, antimicrobial composition, antifungal composition, anti-allergen composition, catalyst, antireflection material, and/or material having heat shield characteristics may be added and used.

The fiber in the antimicrobial/antiviral resin member according to this embodiment may be used for woven fabrics, knitted fabrics, nonwoven fabrics, paper materials such as mixed papers, and so on. Then, this fiber can be used for various products including: sheet-shaped products (e.g., clothing, bedding, bedding materials, masks, handkerchiefs, towels, rugs, curtains, exterior wall materials, construction decorative materials, interior materials); filters for air cleaners, air conditioners, ventilators, vacuum cleaners, fans, air-conditioning, or vehicles; fishing nets such as fish preserve or fixed nets; filters for water treatment; filters for drinking water; filters for ballast water treatment; protective clothing; protection nets; insect screens; or henhouse nets. The fiber in this embodiment is therefore a useful material that makes it possible to provide a variety of excellent products in various fields.

Hereinafter, the invention is specifically described by referring to Examples. However, the invention is not restricted to just these Examples.

Examples 1 to 3

First, 40.0 g of commercially available copper iodide (I) powder (manufactured by Wako Pure Chemical Corporation), which is monovalent copper compound microparticles, and 60.0 g of zirconium oxide particles (manufactured by NIHON DENKO, Inc.), which are inorganic compound microparticles, were pre-dispersed in 900.0 g of methanol. Next, the mixture was crushed and dispersed with a bead mill to prepare a slurry of copper iodide particles coated with zirconium oxide having an average particle size of 140 nm. Note that the average particle size herein refers to a volume-average particle size.

Then, polyvinylpyrrolidone (PVP) and an olefin-based resin were provided and mixed in a toluene solvent. After the mixture was dispersed using a ball mill, the above-described copper iodide particles coated with zirconium oxide were added and further dispersed to produce an antimicrobial/antiviral coating. In Examples 1 to 3, the mass % of each raw material included in the antimicrobial/antiviral coating is as designated in the following Table 1.

Each resulting antimicrobial/antiviral coating was applied onto a polypropylene sheet (with a thickness of 200 μm) by using a bar coater (#20) and then dried to obtain a sheet painted with the antimicrobial/antiviral coating. At that time, the thickness of the coating film was 2 μm.

Example 4

A sheet painted with an antimicrobial/antiviral coating was obtained under the same conditions as for Example 1 except that polyethylene glycol (PEG) was used instead of polyvinylpyrrolidone. The mass % of each raw material included in the antimicrobial/antiviral coating was as designated in the following Table 1.

Example 5

A sheet painted with an antimicrobial/antiviral coating was obtained under the same conditions as for Example 1 except that a urethane-based resin was used instead of the olefin-based resin. The mass % of each raw material included in the antimicrobial/antiviral coating was as designated in the following Table 1.

Example 6

A sheet painted with an antimicrobial/antiviral coating was obtained under the same conditions as for Example 5 except that polyethylene glycol was used instead of polyvinylpyrrolidone. The mass % of each raw material included in the antimicrobial/antiviral coating was as designated in the following Table 1.

Example 7

A sheet painted with an antimicrobial/antiviral coating was obtained under the same conditions as for Example 1 except that an acryl-based resin was used instead of the olefin-based resin. The mass % of each raw material included in the antimicrobial/antiviral coating was as designated in the following Table 1.

Example 8

First, 40.0 g of commercially available cuprous oxide powder (manufactured by Wako Pure Chemical Corporation), which is monovalent copper compound microparticles, and 60.0 g of zirconium oxide particles (manufactured by NIHON DENKO, Inc.), which are inorganic compound microparticles, were pre-dispersed in 900.0 g of methanol. Next, the mixture was crushed and dispersed with a bead mill to prepare a slurry of cuprous oxide particles coated with zirconium oxide having an average particle size of 140 nm. Note that the average particle size herein refers to a volume-average particle size.

Then, polyvinylpyrrolidone and an olefin-based resin were provided and mixed in a toluene solvent. After the mixture was dispersed using a ball mill, the above-described cuprous oxide particles coated with zirconium oxide were added and further dispersed to produce an antimicrobial/antiviral coating. The mass % of each raw material included in the antimicrobial/antiviral coating was as designated in the following Table 1.

The resulting antimicrobial/antiviral coating was applied onto a polypropylene sheet (with a thickness of 200 μm) by using a bar coater (#20) and then dried to obtain a sheet painted with the antimicrobial/antiviral coating. At that time, the thickness of the coating film was 2 μm.

Example 9

A sheet painted with an antimicrobial/antiviral coating was obtained under the same conditions as for Example 8 except that a urethane-based resin was used instead of the olefin-based resin. The mass % of each raw material included in the antimicrobial/antiviral coating was as designated in the following Table 1.

Example 10

A sheet painted with an antimicrobial/antiviral coating was obtained under the same conditions as for Example 8 except that an acryl-based resin was used instead of the olefin-based resin and polyethylene glycol was used instead of polyvinylpyrrolidone. The mass % of each raw material included in the antimicrobial/antiviral coating was as designated in the following Table 1.

Comparative Example 1

A just olefin-based resin was a material, mixed in a toluene solvent, and dispersed with a ball mill to produce a coating. The mass % of the olefin-based resin is 100 mass % as designated in the following Table 2.

The resulting coating was applied onto a polypropylene sheet (with a thickness of 200 μm) by using a bar coater (#20) and then dried to obtain a sheet painted with the coating. At that time, the thickness of the coating film was 2 μm.

Comparative Example 2

A sheet painted with a coating was obtained under the same conditions as for Example 1 except that the mixing and dispersion were carried out while copper iodide particles coated with zirconium oxide were not included. The mass % of each raw material included in this coating was as designated in the following Table 2.

Comparative Example 3

A sheet painted with a coating was obtained under the same conditions as for Example 1 except that the mixing and dispersion were carried out while polyvinylpyrrolidone was not included. The mass % of each raw material included in this coating was as designated in the following Table 2.

Comparative Example 4

A sheet painted with a coating was obtained under the same conditions as for Example 5 except that the mixing and dispersion were carried out while copper iodide particles coated with zirconium oxide were not included. The mass % of each raw material included in this coating was as designated in the following Table 2.

Comparative Example 5

A sheet painted with a coating was obtained under the same conditions as for Example 5 except that the mixing and dispersion were carried out while polyvinylpyrrolidone was not included. The mass % of each raw material included in this coating was as designated in the following Table 2.

Comparative Example 6

A sheet painted with a coating was obtained under the same conditions as for Example 10 except that the mixing and dispersion were carried out while cuprous oxide coated with zirconium oxide were not included. The mass % of each raw material included in this coating was as designated in the following Table 2.

Comparative Example 7

A sheet painted with a coating was obtained under the same conditions as for Example 10 except that the mixing and dispersion were carried out while polyethylene glycol was not included. The mass % of each raw material included in this coating was as designated in the following Table 2.

Here, the following Tables 1 and 2 list the respective components of the antimicrobial/antiviral coatings of Examples 1 to 10 and Comparative Examples 1 to 7 described.

TABLE 1

| | Resin | | Hydrophilic Compound | | Monovalent Copper Compound | |
|---|---|---|---|---|---|---|
| | Kind | Mass % | Kind | Mass % | Kind | Mass % |
| Example 1 | Olefin | 98 | PVP | 1 | Copper Iodide* | 1 |
| Example 2 | Olefin | 96 | PVP | 1 | Copper Iodide* | 3 |
| Example 3 | Olefin | 89 | PVP | 10 | Copper Iodide* | 1 |
| Example 4 | Olefin | 90 | PEG | 5 | Copper Iodide* | 5 |
| Example 5 | Urethane | 94 | PVP | 3 | Copper Iodide* | 3 |
| Example 6 | Urethane | 92 | PEG | 5 | Copper Iodide* | 3 |
| Example 7 | Acrylic | 92 | PVP | 5 | Copper Iodide* | 3 |
| Example 8 | Olefin | 92 | PVP | 5 | Cuprous Oxide* | 3 |
| Example 9 | Urethane | 92 | PVP | 3 | Cuprous Oxide* | 5 |
| Example 10 | Acrylic | 85 | PEG | 5 | Cuprous Oxide* | 10 |

*Dispersant in Examples 1 to 10: Zirconium Oxide

TABLE 2

| | Resin | | Hydrophilic Compound | | Monovalent Copper Compound | |
|---|---|---|---|---|---|---|
| | Kind | Mass % | Kind | Mass % | Kind | Mass % |
| Comparative Example 1 | Olefin | 100 | — | — | — | — |
| Comparative Example 2 | Olefin | 90 | PVP | 10 | — | — |
| Comparative Example 3 | Olefin | 95 | — | — | Copper Iodide* | 5 |
| Comparative Example 4 | Urethane | 95 | PVP | 5 | — | — |
| Comparative Example 5 | Urethane | 95 | — | — | Copper Iodide* | 5 |
| Comparative Example 6 | Acrylic | 95 | PEG | 5 | — | — |
| Comparative Example 7 | Acrylic | 90 | — | — | Cuprous Oxide* | 10 |

*Dispersant in Examples 3, 5, and 7: Zirconium Oxide (Antiviral Performance Evaluation Protocol)

When virus inactivation performance of each sheet painted with an antimicrobial/antiviral coating was measured, influenza virus (influenza A/Kitakyushu/159/93 (H3N2)) cultured using MDCK cells was used.

Each sheet (50 mm×50 mm) painted with the antimicrobial/antiviral coating of each one of Examples 1 to 10 and Comparative Examples 1 to 7 was placed on a plastic dish. Next, 100 μL of virus liquid diluted with PBS was added dropwise thereto and reacted at 25° C. for 15 min. At that time, an upper surface of the sheet test product was covered with a PET film (40 mm×40 mm) such that the area of contact between the virus liquid and the sheet test product was made constant. Then, testing was conducted. After 10-min reaction, 900 μL of SCDLP broth was added so as to stop the reaction. Then, the virus was purged by pipetting. Subsequently, MEM diluent was used to dilute each post-reaction virus liquid to from $10^{-1}$ to $10^{-5}$ (10-fold serial dilution) to prepare sample solutions. Then, 100 μL of each sample solution was seeded onto MDCK cells cultured on a dish. The cells seeded with the sample solution were allowed to stand for 60 min in an incubator at 34° C. and 5% $CO_2$. After the virus was adsorbed on the cells, 0.7% agar broth was overlaid and the virus was cultured for 48 h in the incubator at 34° C. and 5% $CO_2$. After the culturing, formalin fixation and methylene blue staining were conducted and the number of plaques formed was counted to calculate a viral infectivity titer (PFU/0.1 mL, Log 10) (PFU: plaque-forming units).

(Antimicrobial Performance Evaluation Protocol)

When antimicrobial performance of each sheet painted with an antimicrobial/antiviral coating was measured, *E. coli* cultured in NB broth was used.

Each sheet (50 mm×50 mm) painted with the antimicrobial/antiviral coating of each one of Examples 1 to 10 and Comparative Examples 1 to 7 was placed on a plastic dish. Next, 100 μL of microbial cell liquid, which was diluted with 1/500 NB broth until the cell count reached $2.5\times10^5$ to $10\times10^6$, was added dropwise thereto and reacted at 35° C. for 10 min. At that time, an upper surface of the sheet test product was covered with a PET film (40 mm×40 mm) such that the area of contact between the microbial cell liquid and the sheet test product was made constant. Then, testing was conducted. After 15-min reaction, 4 mL of SCDLP broth was added so as to stop the reaction. Then, the microbial cells were purged by pipetting. Subsequently, SCDLP broth was used to dilute each post-reaction microbial cell liquid to from $10^{-1}$ to $10^{-5}$ (10-fold serial dilution) to prepare sample solutions. Then, 1 mL of each sample solution was pipetted onto a dish and 1.5% agar broth was added and mixed therewith. The inverted dish was placed in an incubator at 37° C. and the microbial cells were cultured for 24 to 48 h. After that, the number of colonies was counted to calculate the viable cell count of the microbial cells (CFU/0.1 mL, Log 10) (CFU: colony-forming units).

(Procedure for Measuring Surface Free Energy)

Each sheet painted with the antimicrobial/antiviral coating of each one of Examples 1 to 10 and Comparative Examples 1 to 7 was used to measure the contact angle of each measurement liquid (water or diiodomethane was used) by using a contact angle meter (a solid/liquid interface analyzer DropMaster300, manufactured by Kyowa Interface Science, Inc.). Each measurement result was used to calculate a polar component γsp and a non-polar component γsd by using the above Formula (3) and to calculate the surface free energy γs of each coating film by using the above Formula (1). In addition, the above Formula (2) was used to calculate a polar contribution Rγp.

Here, Tables 3 and 4 collectively provide the respective measurement results of the sheets painted with the antimicrobial/antiviral coatings of Examples 1 to 10 and Comparative Examples 1 to 7 described.

TABLE 3

| | Antiviral Performance Infectivity Titer PFU/0.1 mL, Log10 | Antimicrobial Performance Viable Cell Count CFU/0.1 mL, Log10 | Surface Free Energy γs [mJ/m$^2$] | Polar Contribution Rγp [%] |
|---|---|---|---|---|
| Example 1 | 2.1 | 1.7 | 39.5 | 9.6 |
| Example 2 | 1.6 | 1.2 | 39.0 | 8.9 |
| Example 3 | <1.3 | <1.0 | 39.9 | 17.6 |
| Example 4 | <1.3 | <1.0 | 39.6 | 12.5 |
| Example 5 | <1.3 | <1.0 | 40.4 | 25.7 |
| Example 6 | <1.3 | <1.0 | 40.0 | 24.5 |
| Example 7 | <1.3 | <1.0 | 40.2 | 26.1 |
| Example 8 | 2.5 | 2.4 | 38.7 | 17.0 |
| Example 9 | 2.6 | 2.8 | 40.4 | 24.0 |
| Example 10 | <1.3 | <1.0 | 39.4 | 24.6 |
| Control | 5.8 | 5.6 | — | — |

TABLE 4

| | Antiviral Performance Infectivity Titer PFU/0.1 mL, Log10 | Antimicrobial Performance Viable Cell Count CFU/0.1 mL, Log10 | Surface Free Energy γs [mJ/m$^2$] | Polar Contribution Rγp [%] |
|---|---|---|---|---|
| Comparative Example 1 | 5.8 | 5.7 | 38.6 | 5.7 |
| Comparative Example 2 | 5.7 | 5.4 | 38.8 | 17.4 |
| Comparative Example 3 | 4.4 | 4.1 | 38.8 | 6.0 |
| Comparative Example 4 | 5.7 | 5.7 | 40.5 | 26.0 |
| Comparative Example 5 | 4.1 | 4.6 | 39.2 | 20.7 |
| Comparative Example 6 | 4.3 | 4.7 | 40.0 | 24.3 |
| Comparative Example 7 | 4.9 | 4.1 | 39.1 | 22.6 |
| Control | 5.8 | 5.6 | — | — |

The above results demonstrated potent antimicrobial/antiviral performance regardless of short sensitized time of 10 min in all the Examples 1 to 10. However, in Comparative Examples 1 to 7, the antimicrobial/antiviral performance was not found. In view of the above, when an antimicrobial/antiviral coating of the invention is used, the antimicrobial/antiviral effects can be easily imparted to various products.

Example 11

The coating prepared using the procedure in Example 3 was that in Example 11.

Comparative Example 8

The coating in Comparative Example 8 was a coating adjusted using the same procedure as in Example 3 except that zirconium oxide particles (manufactured by NIHON DENKO, Inc.), which are inorganic compound microparticles, were not used, that is, copper iodide particles not coated with zirconium oxide particles were used.

(Storage Stability Assessment)

An accelerated test was carried out such that the samples of Example 11 and Comparative Example 8 were left for 3 months under conditions at a temperature of 50° C. and a humidity of 90%. Then, a color change (color difference ΔE) between before and after the test was determined with a color-difference meter. Table 5 shows the results.

TABLE 5

| | Color Difference (ΔE) |
|---|---|
| Example 11 | 0.8 |
| Comparative Example 8 | 5.3 |

The results of Table 5 demonstrated that the coating of Comparative Example 8, in which copper iodide not coated with zirconium oxide was used, had a larger color change than that of Example 11, in which copper iodide coated with zirconium oxide was used. It is postulated that a change from a monovalent copper compound to a divalent copper compound was suppressed by coating the surface of copper iodide with zirconium oxide.

(Antimicrobial/Antiviral Performance Evaluation Protocol)

Each coating of Example 11 or Comparative Example 8 was applied onto a polypropylene sheet and dried in the same procedure as in Example 3. The antimicrobial/antiviral performance of each resulting sheet was evaluated by the above-described evaluation protocol. The results are shown in Table 6.

TABLE 6

| | Antiviral Performance Infectivity Titer PFU/0.1 mL, Log10 | Antimicrobial Performance Viable Cell Count CFU/0.1 mL, Log10 |
|---|---|---|
| Example 11 | <1.3 | <1.0 |
| Comparative Example 8 | 3.4 | 4.1 |
| Control | 5.8 | 5.6 |

The results of Table 6 indicate that Comparative Example 8, in which the color change was large, exhibited low effectiveness in both antiviral performance and antimicrobial performance; by contrast, Example 11, in which the color change was small, maintained both antiviral performance and antimicrobial performance.

(To Produce Injection-Molded Member as Antimicrobial/Antiviral Resin Member)

Example 12

A dry grinder Nano Jetmizer NJ-100B (manufactured by Aishin Nano Technologies CO., LTD.) was used to grind commercially available copper (I) iodide powder (manufactured by NIHON KAGAKU SANGYO CO., LTD.) to an average particle size of 150 nm to yield copper iodide particles. The resulting copper iodide particles and a metal soap, which is a dispersant to prevent aggregation of the copper iodide particles, were mixed.

A polyethylene (PE) resin pellet (manufactured by Asahi Kasei Chemicals Corporation), as a base resin, was added, such that the content of the copper iodide particles mixed with the dispersant was 40 mass % with respect to the whole master batch pellet, to prepare a mixture. The resulting mixture was fed to a twin-screw melt kneader to obtain a first master batch pellet.

A polyethylene resin pellet (manufactured by Asahi Kasei Chemicals Corporation), as a base resin, was added, such that the content of polyethylene glycol (with a molecular weight of 20,000) was 20 mass % with respect to the whole master batch pellet, to prepare a mixture. The resulting mixture was fed to a twin-screw melt kneader to obtain a second master batch pellet.

A polyethylene resin pellet, the first master batch pellet, and the second master batch pellet were mixed so as to have 5 mass % of copper iodide and 3 mass % of polyethylene glycol (with a molecular weight of 20,000) with respect to the whole injection-molded member. An injection molding machine was used to perform injection molding, and an injection-molded member, as an antimicrobial/antiviral resin member, was then obtained.

Example 13

A polypropylene (PP) resin pellet as a base resin was added, such that the content of the copper iodide particles mixed with the dispersant (metal soap) was 40 mass % with respect to the whole master batch pellet, to prepare a mixture. The resulting mixture was fed to a twin-screw melt kneader to obtain a master batch pellet.

An injection-molded member as an antimicrobial/antiviral resin member was obtained under the same conditions as for Example 12 except that the polypropylene (PP) resin pellet, the master batch pellet, and polyethylene glycol were mixed so as to have 5 mass % of copper iodide and 5 mass % of polyethylene glycol with respect to the whole injection-molded member.

Example 14

An injection-molded member as an antimicrobial/antiviral resin member was obtained under the same conditions as for Example 13 except that polyvinylpyrrolidone (with a molecular weight of 10,000) was used instead of polyethylene glycol used in Example 13.

Example 15

An ABS resin pellet as a base resin was added, such that the content of copper iodide particles ground with the dispersant was 30 mass % with respect to the whole master batch pellet, to prepare a mixture. The resulting mixture was fed to a twin-screw melt kneader to obtain a master batch pellet.

The ABS resin pellet, the master batch pellet, and polyvinylpyrrolidone were mixed so as to have 5 mass % of copper iodide and 3 mass % of polyvinylpyrrolidone (with a molecular weight of 10,000) with respect to the whole injection-molded member. An injection molding machine was used to perform injection molding, and an injection-molded member, as an antimicrobial/antiviral resin member, was then obtained.

Example 16

An injection-molded member as an antimicrobial/antiviral resin member was obtained under the same conditions as for Example 15 except that the ABS resin pellet, the master batch pellet, and polyvinylpyrrolidone were mixed so as to have 5 mass % of copper iodide and 5 mass % of polyvinylpyrrolidone (with a molecular weight of 10,000) with respect to the whole injection-molded member.

Example 17

The surface of polypropylene (PP) resin pellet was coated, using a Henschel mixer (registered trademark), with a slurry (40 mass %) of copper iodide particles coated with zirconium oxide having an average particle size of 140 nm as used in Example 1. Next, the coated polypropylene resin pellet was fed to a twin-screw melt kneader to yield a first master batch pellet.

A polypropylene (PP) resin was added, such that the content of polyethylene glycol (with a molecular weight of 20,000) was 20 mass % with respect to the whole master batch pellet, to prepare a mixture. The resulting mixture was fed to a twin-screw melt kneader to obtain a second master batch pellet.

A polypropylene (PP) resin pellet, the first master batch pellet, and the second master batch pellet were mixed so as to have 5 mass % of copper iodide and 5 mass % of polyethylene glycol (with a molecular weight of 20,000) with respect to the whole injection-molded member. An injection molding machine was used to perform injection molding, and an injection-molded member as an antimicrobial/antiviral resin member was then obtained.

Comparative Example 9

A just polypropylene resin pellet was a material and an injection molding machine was used to obtain an injection-molded member.

Comparative Example 10

An injection-molded member was obtained under the same conditions as for Example 13 except that the polypropylene resin pellet and the master batch pellet were mixed such that polyethylene glycol was not include and the content of copper iodide was 5 mass % with respect to the whole injection-molded member.

Comparative Example 11

An injection-molded member was obtained under the same conditions as for Example 13 except that the polypropylene resin pellet and polyethylene glycol were mixed such that copper iodide and the dispersant (metal soap) were not included and the content of polyethylene glycol was 10 mass % with respect to the whole injection-molded member.

Comparative Example 12

A just ABS resin pellet was a material and an injection molding machine was used to obtain an injection-molded member.

Comparative Example 13

An injection-molded member was obtained under the same conditions as for Example 15 except that the ABS resin pellet and the master batch pellet were mixed such that polyvinylpyrrolidone was not include and the content of copper iodide was 5 mass % with respect to the whole injection-molded member.

Comparative Example 14

An injection-molded member was obtained under the same conditions as for Example 15 except that the ABS resin pellet and polyvinylpyrrolidone were mixed such that copper iodide and the dispersant (metal soap) were not include and the content of polyvinylpyrrolidone was 10 mass % with respect to the whole injection-molded member.

The following Table 7 lists the components of the injection-molded members of Examples 12 to 17 and Comparative Examples 9 to 14 described.

TABLE 7

| | | Monovalent Copper Compound | | Hydrophilic Compound | |
|---|---|---|---|---|---|
| | Resin | Kind | Mass % | Kind | Mass % |
| Example 12 | PE | Copper Iodide* | 5 | Polyethylene Glycol | 3 |
| Example 13 | PP | Copper Iodide* | 5 | Polyethylene Glycol | 5 |
| Example 14 | PP | Copper Iodide* | 5 | Polyvinylpyrrolidone | 5 |
| Example 15 | ABS | Copper Iodide* | 5 | Polyvinylpyrrolidone | 3 |
| Example 16 | ABS | Copper Iodide* | 5 | Polyvinylpyrrolidone | 5 |
| Example 17 | PP | Copper Iodide* | 5 | Polyethylene Glycol | 5 |
| Comparative Example 9 | PP | — | — | — | — |
| Comparative Example 10 | PP | Copper Iodide* | 5 | — | — |
| Comparative Example 11 | PP | — | — | Polyethylene Glycol | 10 |
| Comparative Example 12 | ABS | — | — | — | — |
| Comparative Example 13 | ABS | Copper Iodide* | 5 | — | — |
| Comparative Example 14 | ABS | — | — | Polyvinylpyrrolidone | 10 |

*Dispersant in Examples 12 to 16 and Comparative Examples 10 and 13: Metal Soap
*Dispersant in Example 17: Zirconium Oxide (To Produce Sheet-Shaped Member as Antimicrobial/Antiviral Resin Member)

Example 18

By using a dry grinder Nano Jetmizer (NJ-100B, manufactured by Aishin Nano Technologies CO., LTD.), commercially available copper (I) iodide powder (manufactured by NIHON KAGAKU SANGYO CO., LTD.) was ground to an average particle size of 150 nm to obtain copper iodide particles. The resulting copper iodide particles and a metal soap, which is a dispersant to prevent aggregation of the copper iodide particles, were mixed.

A polyethylene resin pellet (manufactured by Asahi Kasei Chemicals Corporation) as a base resin was added, such that the content of the resulting copper iodide particles was 40 mass % with respect to the whole master batch pellet, to prepare a mixture. The resulting mixture was fed to a twin-screw melt kneader to obtain a master batch pellet.

A polyethylene resin pellet, the master batch pellet, and polyethylene glycol were mixed so as to have 5 mass % of copper iodide and 1 mass % of polyethylene glycol (with a molecular weight of 20,000) with respect to the whole sheet-shaped member. A T-die extruder was used to obtain a sheet-shaped member as an antimicrobial/antiviral resin member with a thickness of 100 μm.

Example 19

A sheet-shaped member as an antimicrobial/antiviral resin member was obtained under the same conditions as for Example 18 except that the polyethylene resin pellet, the master batch pellet, and polyethylene glycol were mixed so as to have 5 mass % of copper iodide and 5 mass % of polyethylene glycol with respect to the whole sheet-shaped member.

Example 20

A polypropylene resin pellet, as a base resin, was added, such that the content of copper iodide particles was 40 mass % with respect to the whole master batch pellet, to prepare a mixture. The resulting mixture was fed to a twin-screw melt kneader to obtain a master batch pellet. An antimicrobial/antiviral sheet-shaped member was obtained under the same conditions as for Example 18 except that the polypropylene resin pellet, the master batch pellet, and polyethylene glycol were mixed so as to have 5 mass % of copper iodide and 5 mass % of polyethylene glycol with respect to the whole sheet-shaped member.

Comparative Example 15

A just polyethylene resin pellet was a material and a T-die extruder was used to obtain a sheet-shaped member with a thickness of 100 μm.

Comparative Example 16

A sheet-shaped member was obtained under the same conditions as for Example 18 except that the polyethylene resin pellet and the master batch pellet were mixed such that polyethylene glycol was not include and the content of copper iodide was 5 mass % with respect to the whole sheet-shaped member.

Comparative Example 17

A sheet-shaped member was obtained under the same conditions as for Example 18 except that the polyethylene resin pellet and polyethylene glycol were mixed such that copper iodide and the dispersant (metal soap) were not included and the content of polyethylene glycol was 5 mass % with respect to the whole sheet-shaped member.

Comparative Example 18

A sheet-shaped member was obtained under the same conditions as for Example 18 except that the polyethylene resin pellet and polyvinylpyrrolidone were mixed such that copper iodide and the dispersant (metal soap) were not included and the content of polyvinylpyrrolidone instead of polyethylene glycol was 5 mass % with respect to the whole sheet-shaped member.

The following Table 8 lists the components of the sheet-shaped members of Examples 18 to 20 and Comparative Examples 15 to 18 described.

TABLE 8

| | | Monovalent Copper Compound | | Hydrophilic Compound | |
|---|---|---|---|---|---|
| | Resin | Kind | Mass % | Kind | Mass % |
| Example 18 | PE | Copper Iodide* | 5 | Polyethylene Glycol | 1 |
| Example 19 | PE | Copper Iodide* | 5 | Polyethylene Glycol | 5 |
| Example 20 | PP | Copper Iodide* | 5 | Polyethylene Glycol | 5 |
| Comparative Example 15 | PE | — | — | — | — |
| Comparative Example 16 | PE | Copper Iodide* | 5 | — | — |
| Comparative Example 17 | PE | — | — | Polyethylene Glycol | 5 |
| Comparative Example 18 | PE | — | — | Polyvinylpyrrolidone | 5 |

*Dispersant in Examples 18 to 20 and Comparative Example 16: Metal Soap (Antiviral Performance Evaluation Protocol)

When virus inactivation performance of an injection-molded member or a sheet-shaped member was measured, influenza virus (influenza A/Kitakyushu/159/93(H3N2)) cultured using MDCK cells was used as an enveloped virus. As a non-enveloped virus, feline calicivirus, which has been typically and frequently used as a virus alternative for norovirus, was used.

(Injection-Molded Member and Sheet-Shaped Member)

Injection-molded members of Examples 12 to 17 and Comparative Examples 9 to 14 or sheet-shaped members (50 mm×50 mm) of Examples 18 to 20 and Comparative Examples 15 to 18 were each placed on a plastic dish. Next, 100 μL of virus liquid diluted with PBS was added dropwise thereto and reacted at 25° C. for 15 min. At that time, an upper surface of the sheet test product was covered with a PET film (40 mm×40 mm) such that the area of contact between the virus liquid and the sheet test product was made constant. Then, testing was conducted. After 15-min reaction, 900 μL of SCDLP broth was added so as to stop the reaction. Then, the virus was purged by pipetting. Subsequently, MEM diluent was used to dilute each post-reaction virus liquid to from $10^{-1}$ to $10^{-5}$ (10-fold serial dilution) to prepare sample solutions. Then, 100 μL of each sample solution was seeded onto MDCK cells cultured on a dish. The cells seeded with the sample solution were allowed to stand for 60 min in an incubator at 34° C. and 5% $CO_2$. After the virus was adsorbed on the cells, 0.7% agar broth was overlaid and the virus was cultured for 48 h in the incubator at 34° C. and 5% $CO_2$. After the culturing, formalin fixation and methylene blue staining were conducted and the number of plaques formed was counted to calculate a viral infectivity titer (PFU/0.1 mL, Log 10) (PFU: plaque-forming units).

(Antimicrobial Performance Evaluation Protocol)

When antimicrobial performance of each injection-molded member or each sheet-shaped member was measured, *Staphylococcus aureus* cultured in NB broth was used as gram-positive bacteria. As gram-negative bacteria, *E. coli* cultured in NB broth was used.

(Injection-Molded Member and Sheet-Shaped Member)

Injection-molded members of Examples 12 to 17 and Comparative Examples 9 to 14 or sheet-shaped members (50 mm×50 mm) of Examples 18 to 20 and Comparative Examples 15 to 18 were each placed on a plastic dish. Next, 100 μL of microbial cell liquid, which was diluted with 1/500 NB broth until the microbial cell count reached $2.5\times10^5$ to $10\times10^6$, was added dropwise thereto and reacted at 35° C. for 60 min. At that time, an upper surface of the sheet test product was covered with a PET film (40 mm×40 mm) such that the area of contact between the microbial cell liquid and the sheet test product was made constant. Then, testing was conducted. After 60-min reaction, 4 mL of SCDLP broth was added so as to stop the reaction. Then, the microbial cells were purged by pipetting. Subsequently, SCDLP broth was used to dilute each post-reaction microbial cell liquid to from $10^{-1}$ to $10^{-5}$ (10-fold serial dilution) to prepare sample solutions. Then, 1 mL of each sample solution was pipetted onto a dish and 1.5% agar broth was added and mixed therewith. The inverted dish was placed in an incubator at 37° C. and the microbial cells were cultured for 24 to 48 h. After that, the number of colonies was counted to calculate the viable cell count of the microbial cells (CFU/0.1 mL, Log 10) (CFU: colony-forming units).

(Procedure for Measuring Surface Free Energy)

A contact angle meter (a solid/liquid interface analyzer DropMaster300, manufactured by Kyowa Interface Science, Inc.) was used to measure the contact angle of each measurement liquid (water or diiodomethane was used) on a surface of each one of the injection-molded members of Examples 12 to 17 and Comparative Examples 9 to 14 or the sheet-shaped members of Examples 18 to 20 and Comparative Examples 15 to 18. These measurement results were used to calculate a polar component γsp and a non-polar component γsd by using the above Formula (3) and to calculate the surface free energy γs of each injection-molded member or each sheet-shaped member by using the above Formula (1). In addition, the above Formula (2) was used to calculate a polar contribution Rγp.

Here, Table 9 collectively provides the measurement results of the antimicrobial/antiviral resin members that are the injection-molded members of Examples 12 to 17 and Comparative Examples 9 to 14 described.

TABLE 9

| | Resin | Antiviral Performance Infectivity Titer 15-min sensitized | Antimicrobial Performance Viable Cell Count 60-min sensitized | Surface Free Energy γs [mJ/m$^2$] | Polar Contribution Rγp [%] |
|---|---|---|---|---|---|
| Example 12 | PE | 1.8 | 1.8 | 34.7 | 9.6 |
| Example 13 | PP | <1.3 | 1.2 | 34.5 | 13.6 |
| Example 14 | PP | <1.3 | <1.0 | 34.9 | 14.6 |
| Example 15 | ABS | 2.2 | 1.6 | 34.8 | 7.8 |
| Example 16 | ABS | <1.3 | <1.0 | 34.6 | 11.8 |
| Example 17 | PP | 1.5 | 1.6 | 34.7 | 13.3 |
| Comparative Example 9 | PP | 5.7 | 5.4 | 35.1 | 7.4 |
| Comparative Example 10 | PP | 4.8 | 4.8 | 35.1 | 7.4 |
| Comparative Example 11 | PP | 5.5 | 5.2 | 34.4 | 18.0 |

TABLE 9-continued

| | Resin | Antiviral Performance Infectivity Titer 15-min sensitized | Antimicrobial Performance Viable Cell Count 60-min sensitized | Surface Free Energy γs [mJ/m²] | Polar Contribution Rγp [%] |
|---|---|---|---|---|---|
| Comparative Example 12 | ABS | 5.7 | 5.4 | 34.8 | 0.0 |
| Comparative Example 13 | ABS | 4.9 | 5.0 | 34.8 | 0.1 |
| Comparative Example 14 | ABS | 5.7 | 5.2 | 34.4 | 17.8 |
| Control | | 5.8 | 5.4 | | |

As can be seen from the results of the injection-molded members in the above Table 9, in Examples 12 to 17 where an antimicrobial/antiviral agent, a hydrophilic compound, and a dispersant were included in a base resin and the polar contribution Rγp was 2.0% or higher, the viral infectivity titer is more significantly lowered and the viable microbial cell count is also more significantly decreased than those of Comparative Examples 9 to 14.

The following Table 10 collectively provides the measurement results of the antimicrobial/antiviral resin members that are the sheet-shaped members of Examples 18 to 20 and Comparative Examples 15 to 18.

TABLE 10

| | Resin | Antiviral Performance Infectivity Titer 15-min sensitized | Antimicrobial Performance Viable Cell Count 60-min sensitized | Surface Free Energy γs [mJ/m²] | Polar Contribution Rγp [%] |
|---|---|---|---|---|---|
| Example 18 | PE | 1.8 | <1.0 | 34.7 | 8.6 |
| Example 19 | PE | <1.3 | <1.0 | 34.7 | 13.8 |
| Example 20 | PE | 1.8 | <1.0 | 34.8 | 8.0 |
| Comparative Example 15 | PE | 5.5 | 5.4 | 35.0 | 5.8 |
| Comparative Example 16 | PE | 4.3 | 4.6 | 35.1 | 5.7 |
| Comparative Example 17 | PE | 5.6 | 5.4 | 34.7 | 13.5 |
| Comparative Example 18 | PE | 5.4 | 5.4 | 34.7 | 12.6 |
| Control | | 5.8 | 5.4 | | |

As can be seen from the results of the sheet-shaped members of the above Table 10, in Examples 18 to 20 where an antimicrobial/antiviral agent (copper compound microparticles coated with a dispersant) and a hydrophilic compound were included in a base resin, the viral infectivity titer is more significantly lowered and the viable microbial cell count is also more significantly decreased than those of Comparative Examples 15 to 18.

The above has demonstrated that the antimicrobial and/or antiviral effects can be exerted regardless of the kind of base resin. In addition, it has been verified from the above Tables 9 and 10 that the antimicrobial/antiviral resin members of the invention can elicit the antimicrobial and/or antiviral effects regardless of their form.

(To Produce Fiber as Antimicrobial/Antiviral Resin Member)

Example 21

By using a dry grinder Nano Jetmizer (NJ-100B, manufactured by Aishin Nano Technologies CO., LTD.), commercially available copper (I) iodide powder (manufactured by NIHON KAGAKU SANGYO CO., LTD.) was ground to an average particle size of 150 nm to obtain copper iodide microparticles. The resulting copper iodide particles and a metal soap, which is a dispersant to prevent aggregation of the copper iodide particles, were mixed.

A polypropylene resin pellet (manufactured by Asahi Kasei Chemicals Corporation), as a base resin, was added thereto so as to have 40 mass % of the resulting copper iodide. The resulting mixture was fed to a twin-screw melt kneader to obtain a copper iodide master batch pellet.

Commercially available polyethylene glycol (manufactured by SANYO CHEMICAL, LTD.) was added at a content of 30 mass % to a polypropylene resin pellet (manufactured by Asahi Kasei Chemicals Corporation) as a base resin. The resulting mixture was fed to a twin-screw melt kneader to obtain a polyethylene glycol master batch pellet.

A polypropylene resin pellet, the copper iodide master batch pellet, and the polyethylene glycol master batch pellet were mixed using a tumbler so as to have 1 mass % of copper iodide and 3 mass % of polyethylene glycol. Next, melt spinning was carried out to obtain monofilament fiber, which was an antimicrobial/antiviral resin member with a fineness of 300 D.

Example 22

Regarding a copper iodide master batch pellet and a polyethylene glycol master batch pellet, those prepared in Example 21 were used.

A polypropylene resin pellet, the copper iodide master batch pellet, and the polyethylene glycol master batch pellet were mixed using a tumbler so as to have 1 mass % of copper iodide and 3 mass % of polyethylene glycol in its sheath. Next, a polypropylene resin pellet was used as its core. Then, melt spinning was carried out to obtain monofilament fiber that had a core-sheath structure and was an antimicrobial/antiviral resin member having a core-sheath area ratio of 7/3 and a fineness of 300 D.

Comparative Example 19

Regarding a copper iodide master batch pellet, the one prepared in Example 21 was used.

A polypropylene resin pellet and the copper iodide master batch pellet were mixed using a tumbler so as to have 1 mass % of copper iodide. Next, melt spinning was carried out to obtain monofilament fiber with a fineness of 300 D.

The following Table 11 lists the components of the fibers of Examples 21 to 22 and Comparative Example 19 described.

TABLE 11

| | Resin | Monovalent Copper Compound | | Hydrophilic Compound | |
|---|---|---|---|---|---|
| | | Kind | Mass % | Kind | Mass % |
| Example 21 | PP | Copper Iodide* | 1 | Polyethylene Glycol | 3 |
| Example 22 | PP | Copper Iodide* | 1 | Polyethylene Glycol | 3 |
| Comparative Example 19 | PP | Copper Iodide* | 1 | — | — |

*Dispersant in Examples 21 and 22 and Comparative Example 19: Metal Soap (Antiviral Performance Evaluation Protocol)

When virus inactivation performance of monofilament fiber was measured, influenza virus (influenza A/Kitakyushu/159/93(H3N2)) cultured using MDCK cells was used as an enveloped virus. As a non-enveloped virus, feline calicivirus, which has been typically and frequently used as a virus alternative for norovirus, was used.

Monofilament fiber, which was an antimicrobial/antiviral resin member of each of Example 21 or 22 or Comparative Example 19, was wound around the middle of a glass plate (50 mm×100 mm) as a single layer with a width of 60 mm without any gap. The glass plate, around which the monofilament fiber was wound, was placed in a plastic container. Then, 200 μL of virus liquid diluted with sterile water was added dropwise and was reacted therewith at 25° C. for 15 min. At that time, an upper surface of the monofilament fiber test product was covered with a PET film (40 mm×40 mm) such that the area of contact between the virus liquid and the monofilament fiber test product was made constant. Then, testing was conducted. After 15-min reaction, 20 mL of SCDLP broth was added so as to stop the reaction. Then, the virus was purged by pipetting. Subsequently, MEM diluent was used to dilute each post-reaction virus liquid to from $10^{-2}$ to $10^{-5}$ (10-fold serial dilution) to prepare sample solutions. Then, 100 μL of each sample solution was seeded onto MDCK cells cultured on a dish. The cells seeded with the sample solution were allowed to stand for 60 min in an incubator at 34° C. and 5% $CO_2$. After the virus was adsorbed on the cells, 0.7% agar broth was overlaid and the virus was cultured for 48 h in the incubator at 34° C. and 5% $CO_2$. After the culturing, formalin fixation and methylene blue staining were conducted and the number of plaques formed was counted to calculate a viral infectivity titer (PFU/0.1 mL, Log 10) (PFU: plaque-forming units).

(Antimicrobial Performance Evaluation Protocol)

When antimicrobial performance of each monofilament fiber as an antimicrobial/antiviral resin member was measured, *Staphylococcus aureus* cultured using NB broth was used as gram-positive bacteria. As gram-negative bacteria, *E. coli* cultured using NB broth was used.

Monofilament fiber, which was an antimicrobial/antiviral resin member of each of Example 21 or 22 or Comparative Example 19, was wound around the middle of a glass plate (50 mm×100 mm) as a single layer with a width of 60 mm without any gap. The glass plate, around which the monofilament fiber was wound, was placed in a plastic container. Then, 100 μL of microbial cell liquid diluted with sterile water was added dropwise and was reacted therewith at 35° C. for 15 min. At that time, an upper surface of the monofilament fiber test product was covered with a PET film (40 mm×40 mm) such that the area of contact between the microbial cell liquid and the monofilament fiber test product was made constant. Then, testing was conducted. After 15-min reaction, 20 mL of SCDLP broth was added so as to stop the reaction. Then, the microbial cells were purged by pipetting. Subsequently, SCDLP broth was used to dilute each post-reaction microbial cell liquid to from $10^{-1}$ to $10^{31}$ $_{5}$ (10-fold serial dilution) to prepare sample solutions. Then, 1 mL of each sample solution was pipetted onto a dish and 1.5% agar broth was added and mixed therewith. The inverted dish was allowed to stand in an incubator at 37° C. and the microbial cells were cultured for 24 to 48 h. After that, the number of colonies was counted to calculate the viable cell count of the microbial cells (CFU/0.1 mL, Log 10) (CFU: colony-forming units).

(Surface Free Energy)

A contact angle meter (an automated micro-contact meter MCA-3, manufactured by Kyowa Interface Science, Inc.) was used to measure the contact angle of each measurement liquid (water or diiodomethane was used) on a surface of the monofilament fiber of Example 21 or 22 or Comparative Example 19. These measurement results were used to calculate a polar component γsp and a non-polar component γsd by using the above Formula (3) and to calculate the surface free energy γs of each monofilament fiber by using the above Formula (1). In addition, the above Formula (2) was used to calculate a polar contribution Rγp.

Here, the following Table 12 collectively provides the measurement results regarding the monofilament fibers of Examples 21 to 22 and Comparative Example 19 described.

TABLE 12

| | Antiviral Performance Infectivity Titer (PFU/0.1 mL, Log10) | Antimicrobial Performance Viable Cell Count (CFU/0.1 mL, Log10) | Surface Free Energy γs [mJ/m²] | Polar Contribution Rγp [%] |
|---|---|---|---|---|
| Example 21 | <2.3 | <1.3 | 34.5 | 9.5 |
| Example 22 | <2.3 | <1.3 | 34.7 | 9.6 |
| Comparative Example 19 | 5.7 | 2.2 | 35.1 | 7.4 |
| Control | 6.2 | 6.0 | — | — |

It was found that Examples 21 and 22, where a compound with a polar group (polyethylene glycol) was added, elicited potent antimicrobial performance and antiviral performance. In contrast to this result, the result of Comparative Example 19 free of a compound with a polar group was inferior both in antimicrobial performance and antiviral performance. The above results have confirmed that it is possible to provide potent antimicrobial/antiviral products by using monofilament fiber as an antimicrobial/antiviral resin member of the invention.

In conclusion, it has been demonstrated that any antimicrobial/antiviral composition, which is included in an antimicrobial/antiviral coating and/or an antimicrobial/antiviral resin member, according to the invention elicits antimicrobial and/or antiviral performance.

The invention claimed is:

1. An antimicrobial/antiviral composition comprising:
- monovalent copper compound microparticles comprising at least one of cuprous oxide and copper iodide;
- a resin;
- a dispersant comprising at least one of a metal oxide and a metal soap; and
- 1 mass % to 10 mass % of a hydrophilic compound,
- wherein the metal soap is a fatty acid and a metal selected from the group consisting of lithium, magnesium, calcium, barium, and zinc,
- wherein the hydrophilic compound is at least one selected from the group consisting of polyvinylpyrrolidone and polyethylene glycol,
- wherein the hydrophilic compound is immiscible with the resin and causes discontinuous phases that are micro-dispersed in the resin, and
- wherein a phase-separated structure is formed with the hydrophilic compound and the resin, and phase separation of the phase-separated structure occurs microscopically.

2. The antimicrobial/antiviral composition according to claim 1, wherein the hydrophilic compound is polyvinylpyrrolidone.

3. The antimicrobial/antiviral composition according to claim 1, wherein the hydrophilic compound is polyethylene glycol.

4. An antimicrobial/antiviral coating comprising:

the antimicrobial/antiviral composition according to claim 1, wherein a polar contribution (Rγp) of a polar component (γsp) to a surface free energy (γs) of a coating film formed by drying and/or curing the antimicrobial/antiviral composition is 2.0% or higher and 40.0% or lower, wherein the surface free energy (yγs) is defined by the following Formula (1); and the polar contribution (Rγp) is defined by the following Formula (2);

$$\gamma s = \gamma sd + \gamma sp \tag{1}$$

$$R\gamma p = \frac{\gamma sp}{\gamma s} \times 100 \tag{2}$$

wherein γsd is a non-polar component in the surface free energy (γs).

5. The antimicrobial/antiviral coating according to claim 4, wherein the polar contribution (Rγp) of the polar component (γsp) to the surface free energy of the coating film formed by drying and/or curing the antimicrobial/antiviral composition is 10.0% or higher and 40.0% or lower.

6. An antimicrobial/antiviral resin member comprising:

the antimicrobial/antiviral composition according to claim 1, wherein a polar contribution (Rγp) of a polar component (γsp) to a surface free energy (γs) of the antimicrobial/antiviral resin member is 2.0% or higher and 40.0% or lower, wherein the surface free energy (γs) is defined by the following Formula (1); and the polar contribution (Rγp) is defined by the following Formula (2);

$$\gamma s = \gamma sd + \gamma sp \tag{1}$$

$$R\gamma p = \frac{\gamma sp}{\gamma s} \times 100 \tag{2}$$

wherein γsd is a non-polar component in the surface free energy (γs).

7. The antimicrobial/antiviral resin member according to claim 6, wherein the polar contribution (Rγp) of the polar component (γsp) to the surface free energy of the antimicrobial/antiviral resin member is 10.0% or higher and 40.0% or lower.

8. The antimicrobial/antiviral resin member according to claim 6, wherein the antimicrobial/antiviral resin member is a molding.

9. The antimicrobial/antiviral resin member according to claim 6, wherein the antimicrobial/antiviral resin member is fiber.

10. The antimicrobial/antiviral resin member according to claim 9, wherein the hydrophilic compound is polyvinylpyrrolidone.

11. The antimicrobial/antiviral resin member according to claim 9, wherein the hydrophilic compound is polyethylene glycol.

12. A method of producing the antimicrobial/antiviral composition according to claim 1, comprising:

mixing the resin, the dispersant, and the hydrophilic compound to give a mixture; and mixing the mixture and the monovalent copper compound microparticles.

13. A method of producing the antimicrobial/antiviral resin member according to claim 6, comprising:

mixing the resin, the dispersant, and the monovalent copper compound microparticles to give a first mixture;

mixing the resin and the hydrophilic compound to give a second mixture; and mixing the first mixture and the second mixture.

14. The antimicrobial/antiviral composition according to claim 1, wherein the discontinuous phases each have a size of 1 μm or less.

* * * * *